(12) United States Patent
Funk et al.

(10) Patent No.: US 7,915,363 B2
(45) Date of Patent: Mar. 29, 2011

(54) ACIDIC SUPERABSORBENT HYDROGELS

(75) Inventors: Rüdiger Funk, Niedernhausen (DE); Norbert Herfert, Altenstadt (DE); Mariola Wanior, Erlensee (DE); Uwe Stüven, Bad Soden (DE); Martin Beck, Maxdorf (DE)

(73) Assignee: BASF Aktiengesellschaft

( * ) Notice: Subject to any disclaimer, the term of this patent is extended or adjusted under 35 U.S.C. 154(b) by 0 days.

(21) Appl. No.: 11/706,906

(22) Filed: Feb. 13, 2007

(65) Prior Publication Data

US 2007/0149716 A1 Jun. 28, 2007

Related U.S. Application Data

(60) Continuation of application No. 11/145,653, filed on Jun. 6, 2005, now abandoned, which is a division of application No. 10/480,980, filed as application No. PCT/EP02/06877 on Jun. 21, 2002, now abandoned.

(30) Foreign Application Priority Data

Jun. 28, 2001 (DE) .................. 101 30 671
Aug. 30, 2001 (DE) .................. 101 42 138
Sep. 27, 2001 (DE) .................. 101 47 713

(51) Int. Cl.
C08F 20/06 (2006.01)
C08F 20/02 (2006.01)
B01D 15/00 (2006.01)

(52) U.S. Cl. ............. 526/317.1; 127/49; 525/329.7
(58) Field of Classification Search ............. 526/317.1; 127/49; 525/329.7
See application file for complete search history.

(56) References Cited

U.S. PATENT DOCUMENTS

| | | | |
|---|---|---|---|
| 4,587,319 A | 5/1986 | Tournier et al. | |
| RE32,649 E | 4/1988 | Brandt et al. | |
| 4,931,497 A | 6/1990 | Engelhardt et al. | |
| 5,041,496 A | 8/1991 | Engelhardt et al. | |
| 5,241,009 A | 8/1993 | Yarbrough et al. | |
| 5,397,845 A | 3/1995 | Rebre et al. | |
| 5,409,771 A | 4/1995 | Dahmen et al. | |
| 5,412,037 A | 5/1995 | Rebre et al. | |
| 5,712,316 A | 1/1998 | Dahmen et al. | |
| 6,060,557 A | 5/2000 | Dahmen et al. | |
| 6,297,319 B1 * | 10/2001 | Nagasuna et al. | 525/96 |
| 6,403,700 B1 | 6/2002 | Dahmen et al. | |
| 6,605,673 B1 | 8/2003 | Mertens et al. | |

FOREIGN PATENT DOCUMENTS

| | | |
|---|---|---|
| DE | 39 10 563 | 10/1990 |
| DE | 40 20 780 | 8/1991 |
| DE | A19529348 | 2/1997 |
| EP | A205674 | 12/1986 |
| EP | A312952 | 4/1989 |
| EP | 0 316 792 | 5/1989 |
| EP | 0 349 240 | 1/1990 |
| EP | A349240 | 1/1990 |
| EP | B583178 | 2/1994 |
| EP | 0 942 014 | 9/1999 |
| EP | 1 178 059 | 2/2002 |
| GB | 2 093 351 | 9/1982 |
| GB | A2326348 | 12/1998 |
| JP | 11-263850 | 9/1999 |
| WO | WO-95/02002 | 1/1995 |
| WO | WO-95/26209 | 10/1995 |
| WO | WO-98/49221 | 11/1998 |
| WO | WO-98/57677 | 12/1998 |
| WO | WO-99/42496 | 8/1999 |
| WO | WO-00/35505 | 6/2000 |
| WO | WO-0035502 | 6/2000 |
| WO | WO-00/53644 | 9/2000 |

OTHER PUBLICATIONS

Buchholz, Fredric L., and Andrew T. Graham. *Modern Superabsorbent Polymer Technology*, New York: Wiley-VCH, 1998.
Opposition against BASF Aktiengesellschaft European Patent No. 1 425 320 filed by Nippon Shokubai Co., Ltd dated Jun. 11, 2007.
Opposition against BASF Aktiengesellschaft European Patent No. 1 425 320 filed by Stockhausen GmbH dated Jun. 20, 2007.
BASF Aktiengesellschaft Response to Oppositions against European Patent No. 1 425 320 filed by Nippon Shokubai Co., Ltd and Stockhausen GmbH dated Feb. 5, 2008.
Opposition against BASF Aktiengesellschaft European Patent No. 1 425 320 brief filed by Nippon Shokubai Co., Ltd dated Nov. 25, 2008.
Opposition against BASF Aktiengesellschaft European Patent No. 1 425 320 brief filed by Nippon Shokubai Co., Ltd dated Apr. 11, 2010.

* cited by examiner

*Primary Examiner* — William K Cheung
(74) *Attorney, Agent, or Firm* — Marshall, Gerstein & Borun LLP

(57) ABSTRACT

The present invention relates to novel hydrophilic swellable addition polymers comprising improved odor control, a process for their preparation and their use for absorbing aqueous fluids and a process for screening superabsorbents.

19 Claims, No Drawings

ACIDIC SUPERABSORBENT HYDROGELS

CROSS REFERENCE TO RELATED APPLICATIONS

This is a continuation of U.S. patent application Ser. No. 11/145,653, filed Jun. 6, 2005 (now abandoned), which is a divisional of U.S. patent application Ser. No. 10/480,980, filed Dec. 15, 2003 (now abandoned), which is the U.S. national phase application of International Application No. PCT/EP02/06877, filed Jun. 21, 2002, which claims the benefit of German patent application Nos. 101 30 671.7, filed Jun. 28, 2001, 101 42 138.9, filed Aug. 30, 2001, and 101 47 713.9, filed Sept. 27, 2001.

The present invention relates to novel hydrophilic swellable addition polymers comprising improved odor control, their preparation and their use for absorbing aqueous fluids and also a process for screening superabsorbents.

More particularly, the present invention relates to acidic superabsorbent hydrogels having a pH$\leq$5.7, i.e., hydrogels based on polyacrylic acid whose degree of neutralization is preferably $\leq$60 mol %, processes for their preparation and their use in hygiene articles.

Swellable hydrogel forming addition polymers, known as superabsorbent polymers or SAPs, are known from the prior art. They are networks of flexible hydrophilic addition polymers, which can be both ionic and nonionic in nature. They are capable of absorbing and binding aqueous fluids by forming a hydrogel and therefore are preferentially used for manufacturing tampons, diapers, sanitary napkins, incontinence articles, training pants for children, insoles and other hygiene articles for the, absorption of body fluids. Superabsorbents are also used in other fields of technology where fluids, especially water or aqueous solutions, are absorbed. These fields include for example storage, packaging, transportation (packaging material for water-sensitive articles, for example flower transportation, shock protection); food sector (transportation of fish, fresh meat; absorption of water, blood in fresh fish/meat packs); medicine (wound plasters, water-absorbent material for burn dressings or for other weeping wounds), cosmetics (carrier material for pharmaceuticals and medicaments, rheumatic plasters, ultrasound gel, cooling gel, cosmetic thickeners, sunscreen); thickeners for oil/water or water/oil emulsions; textiles (gloves, sportswear, moisture regulation in textiles, shoe inserts); chemical process industry applications (catalyst for organic reactions, immobilization of large functional molecules (enzymes), adhesive for agglomerations, heat storage media, filtration aids, hydrophilic component in polymer laminates, dispersants, liquefiers); building and construction, installation (powder injection molding, clay-based renders, vibration-inhibiting medium, assistants in relation to tunneling in water-rich ground, cable sheathing); water treatment, waste treatment, water removal (de-icers, reusable sandbags); cleaning; agriculture industry (irrigation, retention of meltwater and dew precipitates, composting additive, protection of forests against fungal and insect infestation, delayed release of active ingredients to plants); fire protection (flying sparks) (covering houses or house walls with SAP gel, since water has a very high heat capacity, ignition can be prevented; spraying of SAP gel in the case of fires such as for example forest fires); coextrusion agent in thermoplastic polymers (hydrophilicization of multilayer films); production of films and thermoplastic moldings capable of absorbing water (for example agricultural films capable of storing rain and dew water; SAP-containing films for keeping fresh fruit and vegetables which can be packed in moist films; the SAP stores water released by the fruit and vegetables without forming condensation droplets and partly reemits the water to the fruit and vegetables, so that neither fouling nor wilting occurs; SAP-polystyrene coextrudates for example for food packs such as meat, fish, poultry, fruit and vegetables); carrier substance in active-ingredient formulations (drugs, crop protection). Within hygiene articles, superabsorbents are generally positioned in an absorbent core which, as well as SAP, comprises other materials, including fibers (cellulose fibers), which act as a kind of liquid buffer to intermediately store the spontaneously applied liquid insults and are intended to ensure efficient channelization of the body fluids in the absorbent core toward the superabsorbent.

The current trend in diaper design is toward ever thinner constructions having a reduced cellulose fiber content and an increased hydrogel content. The trend toward ever thinner diaper constructions has substantially changed the performance profile required of the water swellable hydrophilic polymers over the years. Whereas at the start of the development of highly absorbent hydrogels it was initially solely the very high swellability on which interest focused, it was subsequently determined that the ability of the superabsorbent to transmit and distribute fluid is also of decisive importance. It has been determined that conventional superabsorbents greatly swell at the surface on wetting with liquid, so that transportation of liquid into the particle interior is substantially compromised or completely prevented. This trait of superabsorbents is known as gel blocking. The greater amount of polymer per unit area in the hygiene article must not cause the swollen polymer to form a barrier layer to subsequent fluid. A product having good transportation properties will ensure optimal utilization of the entire hygiene article. This prevents the phenomenon of gel blocking, which in the extreme case will cause the hygiene article to leak. Fluid transmission and distribution is thus of decisive importance with regard to the initial absorption of body fluids.

Good transportation properties are possessed for example by hydrogels having high gel strength in the swollen state. Gels lacking in strength are deformable under an applied pressure, for example pressure due to the bodyweight of the wearer of the hygiene article, and clog the pores in the SAP/cellulose fiber absorbent and so prevent continued absorption of fluid. Enhanced gel strength is generally obtained through a higher degree of crosslinking, although this reduces retention performance. An elegant way to enhance gel strength is surface postcrosslinking. In this process, dried superabsorbents having an average crosslink density are subjected to an additional crosslinking step. The process is known to one skilled in the art and described in EP-A-0 349 240. Surface postcrosslinking increases the crosslink density in the sheath of the superabsorbent particle, whereby the absorbency under load is raised to a higher level. Whereas the absorption capacity decreases in the superabsorbent particle sheath, the core has an improved absorption capacity (compared to the sheath) owing to the presence of mobile polymer chains, so that sheath construction ensures improved fluid transmission without occurrence of the gel blocking effect. It is perfectly desirable for the total capacity of the superabsorbent to be occupied not spontaneously but with time delay. Since the hygiene article is generally repeatedly insulted with urine, the absorption capacity of the superabsorbent should sensibly not be exhausted after the first disposition.

When hydrogels are used in the hygiene sector, they become exposed to body fluids such as urine or menses. Body fluids generally contain malodorous components of the amine or fatty acid type, which appear alongside the organic components anyhow present, for example, amines, acids, aldehydes, ketones, phenols, polycyclics, indoles, aromatics, polyaromatics, etc., that are responsible for unpleasant body odors. Odor development takes place in two stages, first in the course of exudation from the body region and then when the fluid has already been present in the absorption medium for a defined time. Both odor factors have to be eliminated, since it is undesirable for cost reasons to change the hygiene article after every absorption process.

The literature on odor control in the hygiene sector reveals the following approaches:

Odor control coupled with simultaneous absorption by addition of inert inorganic substances having a large surface area, generally as a solid onto the surface of powders or granules for manufacturing absorbent polymers. Zeolites, active carbon, bentonites, finely divided amorphous silicas such as AEROSIL® or CAB-O-SIL® are used here.

Addition of substances capable of complexing with organic molecules or with metal ions present in the body fluid to prevent the development of unpleasant odors. This preferably takes the form of the use of cyclodextrins (any modification of unsubstituted cyclodextrins which contains from 6 to 12 glucose units, for example alpha-cyclodextrin and beta-cyclodextrin, gamma-cyclodextrin and/or derivatives and/or mixtures thereof. Mixtures of cyclodextrins are preferred, since they provide broader complexation of organic molecules over a wider molecular weight range. Cyclodextrins are used from 0.1% to about 25%, preferably from 1% to about 20%, more preferably from 2% to about 15% and especially from 3 to 10%, based on the total weight of the composition. Cyclodextrins are added in small particle size (usually less than 12 μm) to offer a large surface area for odor elimination. Further complexing agents are aminopolycarboxylic acids and their salts, ethylenediaminetetraacetate EDTA ethylenediaminepentamethylenephosphonic acid, ethylenediaminetetramethylenephosphonic acid, aminophosphates, polyfunctional aromatics, N,N-disuccinic acid.

Masking of unpleasant odors by addition of perfumes or deodorants. These are added in free form or in encapsulated form (for example in cyclodextrins). The latter form makes it possible to release the perfume with a time delay. Nonlimiting examples of perfumes are allyl caproate, allylcyclohexane acetate, allylcyclohexane propionate, allyl heptanoate, amyl acetate, amyl propionate, anetole, anisole, benzaldehyde, benzyl acetate, benzylacetone, benzyl alcohol, benzyl butyrate, benzyl formate, benzyl isovalerate, benzyl propionate, butyl benzoate, butyl caproate, camphor, cis-3-hexenyl acetate, cis-3-hexenyl butyrate, cis-3-hexenyl caproate, cis-3-hexenyl valerate, citronellol, citronellyl derivates, Cyclal C, cyclohexylethyl acetate, 2-decenal, decylaldehyde, dihydromyrcenol, dimethylbenzylcarbinol and derivatives thereof, dimethyloctanol, diphenyl oxide, ethyl acetate, ethyl acetoacetate, ethyl amyl ketone, ethyl benzoate, ethyl butyrate, ethyl hexyl ketone, ethyl phenylacetate, eucalyptol, fenchyl acetate, fenchyl alcohol, tricyclodecenyl acetate, tricyclodecenyl propionate, geraniol, geranyl derivatives, heptyl acetate, heptyl isobutyrate, heptyl propionate, hexenol, hexenyl acetate, hexenyl isobutyrate, hexyl acetate, hexyl formate, hexyl isobutyrate, hexyl isovalerate, hexyl neopentanoate, hydroxycitronellal, α-ionone, β-ionone, γ-ionone, isoamyl alcohol, isobornyl acetate, isobornyl propionate, isobutyl benzoate, isobutyl caproate, isononyl acetate, isononyl alcohol, isomenthol, isomenthone, isononyl acetate, isopulegol, isopulegyl acetate, iso-quinoline, dodecanal, lavandulyl acetat, ligustral, δ-limonene, linalool and derivatives, menthone, menthyl acetate, methylacetophenone, methyl amyl ketone, methyl anthranilate, methyl benzoate, methyl benzylacetate, methylchavicol, methyleugenol, methylheptenone, methyl heptynecarbonate, methyl heptyl ketone, methyl hexyl ketone, methylnonylacetaldehyde, α-iso"γ"methylionone, methyloctylacetaldehyde, methyl octyl ketone, methylphenylcarbinyl acetate, methyl salicylate, myrcene, myrcenyl acetate, neral, nerol, neryl acetate, nonalactone, nonyl butyrate, nonyl alcohol, nonyl acetate, nonylaldehyde, octalactone, octyl acetate, octyl alcohol, octylaldehyde, d-limonene, p-cresol, p-cresyl methyl ether, p-cymene, p-isopropyl-p-methylacetophenone, phenethyl anthranilate, phenoxyethanol, phenylacetaldehyde, phenylethyl acetate, phenylethyl alcohol, phenylethyldimethylcarbinol, α-pinene, β-pinene, α-terpinene, γ-terpinene, terpineol, terpinyl acetate, terpinyl propionate, tetrahydrolinalool, tetrahydromyrcenol, thymol, prenyl acetate, propyl butyrate, pulegone, safrole, δ-undecalactone, γ-undecalactone, undecanal, undecyl alcohol, veratrol, verdox, vertenex, viridine.

Addition of urease inhibitors to control the formation or activity of enzymes responsible for the cleavage of urea into ammonia and hence for odor development.

Addition of antimicrobial substances. Enzymes control bacterial growth and thereby minimize odor development due to bacterial degradation processes (e.g., oxidoreductase+mediator). Examples of antimicrobial substances include quaternary ammonium compounds, phenols, amides, acids and nitro compounds and also mixtures thereof.

Examples of quaternary ammonium compounds include 2-(3-anilinovinylul)3,4-dimethyloxazolinium iodide, alkylisoquinolium bromide, benzalkonium chloride, benzethonium chloride, cetylpyridinium chloride, chlorhexidine gluconate, chlorhexidine hydrochloride, lauryltrimethylammonium compounds, methylbenzethonium chloride, stearyltrimethylammonium chloride, 2,4,5-trichlorophenoxide and also mixtures thereof.

Examples of phenols include benzyl alcohol, p-chlorophenol, chlorocresol, chloroxylenol, cresol, o-cymen-5-ol (BIOSOL), hexachlorophene, chinokitiol, isopropylmethylphenol, parabens (with methyl, ethyl, propyl, butyl, isobutyl, isopropyl, and/or sodium methyl substituents), phenethyl alcohol, phenol, phenoxyethanol, o-phenylphenol, resorcinol, resorcinol monoacetate, sodium parabens, sodium phenolsulfonate, thioxolone, 2,4,4'-trichloro-2'-hydroxydiphenyl ether, zinc phenolsulfonate, di-tert-butylphenol, hydroquinone, BHT and also mixtures thereof.

Examples of amides include diazolidinylurea, 2,4-imidazolidinedione (HYDATOIN), 3,4,4'-trichlorocarbanilide, 3-trifluoromethyl-4,4'-dichlorocarbanilide, undecylenoic acid monoethanolamide and also mixtures thereof.

Examples of acids include benzoates, benzoic acid, citric acid, dehydroacetic acid, potassium sorbate, sodium citrates, sodium dehydroacetate, sodium salicylate, sodium salicylic acid, sorbitanic acid, undecylenoic acid, zinc undecylenate, zinc oxide, zinc phenolsulfonate, ascorbic acid, acetylsalicylic acid, salicylaldehyde, salicylic acid derivatives, adipic acid, adipic acid derivatives and also mixtures thereof.

Examples of nitro compounds include 2-bromo-2-nitro-2,3-propanediol (BRONOPOL), methyldibromoglutaronitrile and propylene glycol (MERGUARD) and also mixtures thereof.

In addition the following compounds are useful as biocides: 2,5-dimethoxytetrahydrofuran, 2,5-diethoxytetrahydrofuran, 2,5-dimethoxy-2,5-dihydrofuran, 2,5-diethoxy-2,5-dihydrofuran, succinaldehyde, glutaraldehyde, glyoxal, glyoxylic acid, hexahydrotriazine, tetrahydro-3,5-dimethyl-2H-1,3,5-thiadiazine-2-thione (Dazomet), 2,4-dichlorobenzyl alcohol, benzalkonium chloride, chlorhexidine gluconate, triclosan.

Use of microcapsules which release the active substance on contact with moisture.

Use of transition metal compounds (Cu, Ag, Zn).

As well as the classes of compounds mentioned, useful odor control compounds further include the following: peroxides, bicarbonate, triclosan, plant extracts, ethereal oils, boron compounds, poly-alpha-amino acids (polylysine), imides, polyimides, PVP-iodine, use of certain polymeric substances such as chitosan, polyglycosides, oxidizing agents, cyclophanes.

In general, however, the addition of odor inhibitors will have an adverse effect on the absorption profile of superabsorbent hydrogels. The separate installation of the odor-inhibiting or deodorizing component system and of the superabsorbent material in the hygiene article generally reduces the absorption capacity. Combinations generally exhibit a worse performance profile than the individual components as such. Moreover, the individual components may separate under mechanical stress of the kind exerted in the course of the wearing of the hygiene article for example. If, however, blends are prepared where the additives adhere to the surface of the dried superabsorbent polymers, the surface properties of the absorbent hydrogels may be changed without the intrinsic absorption properties being impaired. The result may be for example a hydrophilicization or a hydrophobicization, which primarily affects the fluid uptake rate. All these polymers, however, generally have in common that the permeability through swollen gel is unsatisfactory.

Odor control on using acidic hydrogels in hygiene articles is good. However, they exhibit a worse absorption profile than is the case with pH neutral products.

The superabsorbent hydrogels used in the hygiene sector at present are addition polymers possessing a degree of neutralization in the range from 60 to 80 mol %, based on the polymerized acid-functional monomer units. However, it was found with regard to odor control that a higher pH will generally favor bacterial growth. In the process, the urea in the urine is increasingly split by urease into carbon dioxide and urea, which leads a further increase in the pH. This in turn reinforces bacterial growth, and enzyme activity is further increased. One consequence of the raised pH is the occurrence of soft skin, making the skin more susceptible to bacterial colonization. This results directly in skin irritation which will preclude the wearing of the hygiene article for a prolonged period.

The manufacturing process of completely acidic hydrogel forming monomers is known and has been repeatedly described in the literature. EP 205 674 A1 discloses the preparation of completely acidic addition polymers at temperatures from 0 to 100° C., and preferably from 5 to 40° C., which are adjusted by subsequent partial neutralization of the hydrogels. The addition polymers are notable for improved absorption capacity and also for lower extractables. Similarly, U.S. Pat. No. 5,145,906 and EP 530 438 B1 disclose the preparation of addition polymer gels from acrylic acid with polymers containing water-soluble hydroxyl groups in an acidic polymerization, i.e., without neutralization of the monomers, which gels are subsequently comminuted and partially or completely neutralized by means of aqueous bases and subsequently subjected to postcrossslinking. However, the processes all have in common that the polymerization of the monomer solution as shown in EP 467 073 A1 proceeds very slowly, so that only a batch process is possible. Increasing the amount of initiator or raising the polymerization temperature has an adverse effect on the absorption profile of the hydrogels. Moreover, there are appreciable problems during the manufacturing process with the subdivision of the completely acidic polymer gel, and the neutralization which is carried out subsequently merely takes place under diffusion control, so that the polymer surface has a base excess. Hydrogels prepared by acidic polymerization generally exhibit worse absorbencies under load and also an appreciable rewet, and this has an adverse effect on the use in the hygiene sector.

On the other hand, there are processes in existence where the monomer solution has already been subjected to a partial neutralization and whose addition polymer gels are lastly adjusted to the desired degree of neutralization following the polymerization. For instance, DE 195 29 348 reports a process wherein the monomer solution is 5-30 mol %, preferably 5-20 mol % and particularly preferably 5-10 mol % neutralized, based on the acid-functional monomers, whereupon the partially neutralized monomer batch is polymerized and subsequently the addition polymer is further neutralized until at least 50 mol % of the acid groups present therein are neutralized. This process provides addition polymers having a high retention value and a high sorbency under constant and increasing pressure and also having a low level of extractables. EP 0 583 178 B1, in contrast, proposes a process for preparing superabsorbent powders consisting of partially neutralized polyacrylic acids by a sequential inverse suspension polymerization of two charges having different degrees of neutralization (Charge I: degree of neutralization 90-100%, Charge III: degree of neutralization 50-60%), charge II being absorbed before polymerization by the polymer of charge I.

None of the cited processes generates hydrogel forming addition polymers which confer all the absorption profile advantages of the optimized skin pH neutral superabsorbent on acidic addition polymers, so that a distinct odor control unit is required in each case.

GB 2326348 A and WO 00/35502 impressively report the relationship between bacterial growth and the pH of the surrounding medium. Effective control of bacterial growth is said to be possible only at pH values between 3.5 and 4.9, preferably between 4.1 and 4.7. This would correspond to a degree of neutralization in the range from 20 to 35 mol %. However, these references disregard the quantification of the absorption profile underlying hydrogels of this degree of neutralization. GB 2326348 A mentions in general that the lowering of the absorption capacity may be compensated by increasing the amount of hydrogel. WO 00/35502, in contrast, proposes installing the hydrogel forming substance in a layer within the hygiene article that is closer to the skin.

It is an object of the present invention to provide modified superabsorbents (and a process for their preparation) which when used in hygiene articles comprise improved odor inhibition coupled with the excellent absorption profile on the part of the superabsorbent hydrogel material. This hydrogel material shall preferably possess rapid swelling and good transportation properties coupled with a high ultimate absorption capacity and also improved gel strength and higher electrolyte tolerance without exhibiting the adverse effect of gel blocking. The high absorption performance sought shall not be substantially impaired by the odor control system, as has heretofore been the case in the prior art with odor control in the hygiene sector.

We have found that this object is achieved, surprisingly, preferably by the sole use of superabsorbent hydrogels whose acid groups have been neutralized to a lesser degree by the addition of bases before or after the polymerization. The range for the degree of neutralization extends from 5 to 60 mol %, preferably from 10 to 40 mol % and particularly preferably from 20 to 30 mol %, based on the acid-functional monomers.

The present invention accordingly provides for the preparation and use of acidic superabsorbent hydrogels of the above degree of neutralization where preferably no further substances have been added for odor inhibition. Surprisingly, furthermore, we have developed a parameter to quantify the absorption profile—namely the pH absorbency index $pH_{AI}$—which permits an informative assessment of newly developed hydrogel material. Furthermore, the $pH_{AI}$ parameter makes it possible to provide a simple test method for screening and optimizing new materials by summarizing and weighting the relevant characteristics of the superabsorbents.

The preparation and optimization of novel materials increasingly utilizes parallel syntheses with or without the assistance of robot synthesizers. The material obtained has to be performance tested in order that the next generation of materials may be further optimized with regard to one or more parameters. The present invention provides in the pH absorbency index a test parameter which permits simple yet informative assessment of superabsorbents. Moreover, the determination of the individual parameters needed to calculate the index can be miniaturized and parallelized, so that high throughput screening (HTS) of the kind familiar in drug and pesticide discovery research can be carried out. The pH, CFC and AUL-0.7 psi indices can either be determined as described in the description part or estimated by conducting equivalent determinations. Such equivalents include for example the calculation of the degree of neutralization of the monomer used, subsequent neutralization of the gel with known amount of neutralizing agent etc. for the pH; the AUL-0.7 psi can likewise be replaced by similar tests at other pressures.

The invention accordingly provides a process for screening superabsorbents which comprises determining or estimating the pH, CRC and AUL 0.7 psi of a plurality of absorbent samples and determining or estimating the pH absorbency index therefrom. Repeated (iterative) application of this screening process by varying one or more opposing or non-opposing parameters makes it possible to optimize the superabsorbent through varied production processes from each measurement of the pH absorbency index. The novel superabsorbents optimized by this process are likewise claimed. A method for determining the swellability of polymer gels under pressure is described in PCT/EP/01/12959 and can be appropriately adapted. The disclosure content of this PCT specification is incorporated in the disclosure content of the present invention.

Commercially available superabsorbent material has a pH of 6. It is known that the absorption capacity of hydrogels is at a maximum at this pH. Moreover, a high swell rate is observed at this pH. However, the pH at this good absorption performance is distinctly above the pH of the skin, so that the skin may be sensitized and irritated.

The absorption performance at pH 6 can be quantified in terms of the absorbency under load (0.7 psi) (AUL) of 25 g/g for example and a centrifuge retention capacity CRC of 35 g/g for example. Since the above numerical values correlate via the pH, they are simple to combine into one parameter. The starting point for the calculation is the difference in the pH from pH 7:

$$\Delta pH = 7 - pH \text{ of product}$$

The parameter is then calculated therefrom as pH absorbency index=$pH_{AI}$:

$$pH_{AI} = \Delta pH \cdot (AUL_{0.7\,psi} + CRC)$$

It is a good way of quantifying the performance capability of the superabsorbent hydrogel material by stating a single numerical value.

Commercially available polymer material with pH=6, $AUL_{0.7\,psi}$=25 g/g and CRC=35 g/g has a pH absorbency index (calculated as above) of $$pH_{AI} = (7-6) \cdot (25+35) = 60$$

Since commercial products for the hygiene sector constitute optimized superabsorbent hydrogel material, a summation factor of 60 may be considered to be the lower limit for the performance capability of a superabsorbent product.

It has been determined that conventional commercial hydrogel material without any odor control has a summation factor in the range from 55 to 80, predominantly from 60 to 70.

The present invention accordingly provides acidic hydrogel forming polymers which are capable of absorbing aqueous fluids and whose acid functional monomers have been partially neutralized in a small amount by the addition of bases before or after polymerization. The partial neutralization range extends from 5 to 60 mol %, preferably from 10 to 40 mol % and particularly preferably from 20 to 30 mol %, based on the acid functional monomers. More particularly, the present invention provides hydrogel forming polymers capable of absorbing fluids, having a pH of ≦5.7, and having a pH absorbency index of at least 80.

Acidic hydrogel material according to the invention, in contrast, comprises complete odor control due to effective control of bacterial growth and high absorption performance coupled with a summation factor of above 100, for example in the range from 100 to 130.

Experimental Part

Methods of Making a) Monomers Used

Hydrogel-forming polymers are in particular polymers of (co)polymerized hydrophilic monomers, graft (co)polymers of one or more hydrophilic monomers on a suitable grafting base, crosslinked cellulose or starch ethers, crosslinked carboxymethylcellulose, partially crosslinked polyalkylene oxide or natural products that swell in aqueous fluids, for example guar derivatives, alginates and carrageenans.

Suitable grafting bases can be of natural or synthetic origin. Examples are starch, cellulose or cellulose derivatives and also other polysaccharides and oligosaccharides, polyvinyl alcohol, polyalkylene oxides, especially polyethylene oxides and polypropylene oxides, polyamines, polyamides and also hydrophilic polyesters. Suitable polyalkylene oxides have for example the formula

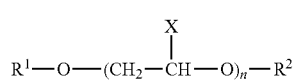

where
$R^1$ and $R^2$ are independently hydrogen, alkyl, alkenyl or acryl,
X is hydrogen or methyl and n is an integer from 1 to 10 000.

$R^1$ and $R^2$ are each preferably hydrogen, $(C_1-C_4)$-alkyl, $(C_2-C_6)$-alkenyl or phenyl.

Preferred hydrogel-forming polymers are crosslinked polymers having acid groups which are predominantly in the form of their salts, generally alkali metal or ammonium salts. Such polymers swell particularly strongly on contact with aqueous fluids to form gels.

Preference is given to polymers which are obtained by crosslinking polymerization or copolymerization of acid-functional monoethylenically unsaturated monomers or salts thereof. It is further possible to copolymerize these monomers without crosslinker and to crosslink them subsequently.

Examples of such monomers bearing acid groups are monoethylenically unsaturated $C_3$- to $C_{25}$-carboxylic acids or anhydrides such as acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid and fumaric acid. It is also possible to use monoethylenically unsaturated sulfonic or phosphonic acids, for example vinylsulfonic acid, allylsulfonic acid, sulfoethyl acrylate, sulfo methacrylate, sulfopropyl acrylate, sulfopropyl methacrylate, 2-hydroxy-3-acryloyloxypropylsulfonic acid, 2-hydroxy-3-methacryloyloxypropylsulfonic acid, vinylphosphonic acid, allylphosphonic acid, styrenesulfonic acid and 2-acrylamido-2-methylpropanesulfonic acid. The monomers may be used alone or mixed.

Preferred monomers used are acrylic acid, methacrylic acid, vinylsulfonic acid, acrylamidopropanesulfonic acid or mixtures thereof, for example mixtures of acrylic acid and methacrylic acid, mixtures of acrylic acid and acrylamidopropanesulfonic acid or mixtures of acrylic acid and vinylsulfonic acid.

To optimize properties, it can be sensible to use additional monoethylenically unsaturated compounds which do not bear an acid group but are copolymerizable with the monomers bearing acid groups. Such compounds include for example the amides and nitriles of monoethylenically unsaturated carboxylic acid, for example acrylamide, methacrylamide and N-vinylformamide, N-vinylacetamide, N-methyl-N-vinylacetamide, acrylonitrile and methacrylonitrile. Examples of further suitable compounds are vinyl esters of saturated $C_1$- to $C_4$-carboxylic acids such as vinyl formate, vinyl acetate or vinyl propionate, alkyl vinyl ethers having at least 2 carbon atoms in the alkyl group, for example ethyl vinyl ether or butyl vinyl ether, esters of monoethylenically unsaturated $C_3$- to $C_6$-carboxylic acids, for example esters of monohydric $C_1$- to $C_{18}$-alcohols and acrylic acid, methacrylic acid or maleic acid, monoesters of maleic acid, for example methyl hydrogen maleate, N-vinyllactams such as N-vinylpyrrolidone or N-vinylcaprolactam, acrylic and methacrylic esters of alkoxylated monohydric saturated alcohols, for example of alcohols having from 10 to 25 carbon atoms which have been reacted with from 2 to 200 mol of ethylene oxide and/or propylene oxide per mole of alcohol, and also monoacrylic esters and monomethacrylic esters of polyethylene glycol or polypropylene glycol, the molar masses $(M_n)$ of the polyalkylene glycols being up to 2 000, for example. Further suitable monomers are styrene and alkyl-substituted styrenes such as ethylstyrene or tert-butylstyrene.

These monomers without acid groups may also be used in mixture with other monomers, for example mixtures of vinyl acetate and 2-hydroxyethyl acrylate in any proportion. These monomers without acid groups are added to the reaction mixture in amounts within the range from 0 to 50% by weight, preferably less than 20% by weight.

Preference is given to crosslinked polymers of monoethylenically unsaturated monomers which bear acid groups and which are optionally converted into their alkali metal or ammonium salts before or after polymerization and of 0-40% by weight, based on their total weight, of monoethylenically unsaturated monomers which do not bear acid groups.

Preference is given to crosslinked polymers of monoethylenically unsaturated $C_3$- to $C_{12}$-carboxylic acids and/or their alkali metal or ammonium salts. Preference is given in particular to crosslinked polyacrylic acids where 5-30 mol %, preferably 5-20 mol % and particularly preferably 5-10 mol % of their acid groups, based on the monomers containing acid groups, are present as alkali metal or ammonium salts.

Possible crosslinkers include compounds containing at least two ethylenically unsaturated double bonds. Examples of compounds of this type are N,N'-methylenebisacrylamide, polyethylene glycol diacrylates and polyethylene glycol dimethacrylates each derived from polyethylene glycols having a molecular weight of from 106 to 8 500, preferably from 400 to 2 000, trimethylolpropane triacrylate, trimethylolpropane trimethacrylate, ethylene glycol diacrylate, ethylene glycol dimethacrylate, propylene glycol diacrylate, propylene glycol dimethacrylate, butanediol diacrylate, butanediol dimethacrylate, hexanediol diacrylate, hexanediol dimethacrylate, allyl methacrylate, diacrylates and dimethacrylates of block copolymers of ethylene oxide and propylene oxide, polyhydric alcohols, such as glycerol or pentaerythritol, doubly or more highly esterified with acrylic acid or methacrylic acid, triallylamine, dialkyldiallylammonium halides such as dimethyldiallylammonium chloride and diethyldiallylammonium chloride, tetraallylethylenediamine, divinylbenzene, diallyl phthalate, polyethylene glycol divinyl ethers of polyethylene glycols having a molecular weight of from 106 to 4 000, trimethylolpropane diallyl ether, butanediol divinyl ether, pentaerythritol triallyl ether, reaction products of 1 mol of ethylene glycol diglycidyl ether or polyethylene glycol diglycidyl ether with 2 mol of pentaerythritol triallyl ether or allyl alcohol, and/or divinylethyleneurea. Preference is given to using water-soluble crosslinkers, for example N,N'-methylenebisacrylamide, polyethylene glycol diacrylates and polyethylene glycol dimethacrylates derived from addition products of from 2 to 400 mol of ethylene oxide with 1 mol of a diol or polyol, vinyl ethers of addition products of from 2 to 400 mol of ethylene oxide with 1 mol of a diol or polyol, ethylene glycol diacrylate, ethylene glycol dimethacrylate or triacrylates and trimethacrylates of addition products of from 6 to 20 mol of ethylene oxide with 1 mol of glycerol, pentaerythritol triallyl ether and/or divinylurea. This invention refers to the same degree of crosslinking when the molar ratios between acid-functional monomers and crosslinkers remain constant with regard to ethylenically unsaturated double bonds.

Possible crosslinkers also include compounds containing at least one polymerizable ethylenically unsaturated group and at least one further functional group. The functional group of these crosslinkers has to be capable of reacting with the functional groups, essentially the acid groups, of the monomers. Suitable functional groups include for example hydroxyl, amino, epoxy and aziridino groups. Useful are for example hydroxyalkyl esters of the abovementioned monoethylenically unsaturated carboxylic acids, e.g., 2-hydroxyethyl acrylate, hydroxypropyl acrylate, hydroxybutyl acrylate, hydroxyethyl methacrylate, hydroxypropyl methacrylate and hydroxybutyl methacrylate, allylpiperidinium bromide, N-vinylimidazoles, for example N-vinylimidazole, 1-vinyl-2-methylimidazole and N-vinylimidazolines such as N-vinylimidazoline, 1-vinyl-2- methylimidazoline, 1-vinyl-2-ethylimidazoline or 1-vinyl-2-propylimidazoline, which can be used in the form of the free bases, in quaternized form or as salt in the polymerization. It is also possible to use dialkylaminoethyl acrylate and dimethylaminoethyl methacrylate, diethylaminoethyl acrylate and diethylaminoethyl methacrylate. The basic esters are preferably used in quaternized form or as salt. It is also possible to use glycidyl (meth)acrylate, for example.

Useful crosslinkers further include compounds containing at least two functional groups capable of reacting with the functional groups, essentially the acid groups, of the monomers. Suitable functional groups were already mentioned above, i.e., hydroxyl, amino, epoxy, isocyanato, ester, amido and aziridino groups. Examples of such crosslinkers are ethylene glycol, diethylene glycol, triethylene glycol, tetraethylene glycol, polyethylene glycol, glycerol, polyglycerol, triethanolamine, propylene glycol, polypropylene glycol, block copolymers of ethylene oxide and propylene oxide, ethanolamine, sorbitan fatty acid esters, ethoxylated sorbitan fatty acid esters, trimethylolpropane, pentaerythritol, 1,3-butanediol, 1,4-butanediol, polyvinyl alcohol, sorbitol, starch, polyglycidyl ethers such as ethylene glycol diglycidyl ether, polyethylene glycol diglycidyl ether, glycerol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether and polypropylene glycol diglycidyl ether, polyaziridine compounds such as 2,2-bishydroxymethylbutanol tris[3-(1-aziridinyl)propionate], 1,6-hexamethylenediethyleneurea, diphenylmethanebis-4,4'-N,N'-diethyleneurea, haloepoxy compounds such as epichlorohydrin and α-methylepifluorohydrin, polyisocyanates such as 2,4-toluylene diisocyanate and hexamethylene diisocyanate, alkylene carbonates such as 1,3-dioxolan-2-one and 4-methyl-1,3-dioxolan-2-one, also bisoxazolines and oxazolidones, polyamidoamines and also their reaction products with epichlorohydrin, also polyquaternary amines such as condensation products of dimethylamine with epichlorohydrin, homo- and copolymers of diallyldimethylammonium chloride and also homo- and copolymers of dimethylaminoethyl (meth)acrylate which are optionally quaternized with, for example, methyl chloride.

Useful crosslinkers further include multivalent metal ions capable of forming ionic crosslinks. Examples of such crosslinkers are magnesium, calcium, barium and aluminum ions. These crosslinkers are used for example as hydroxides, carbonates or bicarbonates. Useful crosslinkers further include multifunctional bases likewise capable of forming ionic crosslinks, for example polyamines or their quaternized salts. Examples of polyamines are ethylenediamine, diethylenetriamine, triethylenetetramine, tetraethylenepentamine, pentaethylenehexamine and polyethyleneimines and also polyamines having molar masses in each case of up to 4 000 000.

The crosslinkers are present in the reaction mixture for example from 0.001 to 20% and preferably from 0.01 to 14% by weight.

a) Free Radical Polymerization

The polymerization is initiated in the generally customary manner, by means of an initiator. But the polymerization may also be initiated by electron beams acting on the polymerizable aqueous mixture. However, the polymerization may also be initiated in the absence of initiators of the abovementioned kind, by the action of high energy radiation in the presence of photoinitiators. Useful polymerization initiators include all compounds which decompose into free radicals under the polymerization conditions, for example peroxides, hyperoxides, hydrogen peroxides, persulfates, azo compounds and redox catalysts. The use of water-soluble initiators is preferred. In some cases it is advantageous to use mixtures of different polymerization initiators, for example mixtures of hydrogen peroxide and sodium peroxodisulfate or potassium peroxodisulfate. Mixtures of hydrogen peroxide and sodium peroxodisulfate may be used in any proportion. Examples of suitable organic peroxides are acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl)peroxydicarbonate, dicyclohexyl peroxydicarbonate, di(4-tert-butylcyclohexyl)peroxydicarbonate, dimyristyl peroxydicarbonate, diacetyl peroxydicarbonate, allyl peresters, cumyl peroxyneodecanoate, tert-butyl per-3,5,5-trimethylhexanoate, acetylcyclohexylsulfonyl peroxide, dilauryl peroxide, dibenzoyl peroxide and tert-amyl perneodecanoate. Particularly suitable polymerization initiators are water-soluble azo initiators, e.g., 2,2'-azobis(2-amidinopropane)dihydrochloride, 2,2'-azobis(N,N'-dimethylene)isobutyramidine dihydrochloride, 2-(carbamoylazo)isobutyronitrile, 2,2'-azobis[2-(2'-imidazolin-2-yl)propane] dihydrochloride and 4,4'-azobis(4-cyanovaleric acid). The polymerization initiators mentioned are used in customary amounts, for example in amounts of from 0.01 to 5%, preferably from 0.05 to 2.0%, by weight, based on the monomers to be polymerized.

Useful initiators also include redox catalysts. In redox catalysts, the oxidizing component is at least one of the above-specified per compounds and the reducing component is for example ascorbic acid, glucose, sorbose, ammonium or alkali metal bisulfite, sulfite, thiosulfate, hyposulfite, pyrosulfite or sulfide, or a metal salt, such as iron(II) ions or sodium hydroxymethylsulfoxylate. The reducing component in the redox catalyst is preferably ascorbic acid or sodium sulfite. Based on the amount of monomers used in the polymerization, from $3 \times 10^{-6}$ to 1 mol % may be used for the reducing component of the redox catalyst system and from 0.001 to 5.0 mol % for the oxidizing component of the redox catalyst, for example.

When the polymerization is initiated using high energy radiation, the initiator used is customarily a photoinitiator. Photoinitiators include for example α-splitters, H-abstracting systems or else azides. Examples of such initiators are benzophenone derivatives such as Michler's ketone, phenanthrene derivatives, fluorene derivatives, anthraquinone derivatives, thioxanthone derivatives, coumarin derivatives, benzoin ethers and derivatives thereof, azo compounds such as the abovementioned free-radical formers, substituted hexaarylbisimidazoles or acylphosphine oxides. Examples of azides are: 2-(N,N-dimethylamino)ethyl 4-azidocinnamate, 2-(N,N-dimethylamino)ethyl 4-azidonaphthyl ketone, 2-(N,N-dimethylamino)ethyl 4-azidobenzoate, 5-azido-1-naphthyl 2'-(N,N-dimethylamino)ethyl sulfone, N-(4-sulfonylazidophenyl)maleimide, N-acetyl-4-sulfonylazidoaniline, 4-sulfonylazidoaniline, 4-azidoaniline, 4-azidophenacyl bromide, p-azidobenzoic acid, 2,6-bis(p-azidobenzylidene)cyclohexanone and 2,6-bis(p-azidobenzylidene)-4-methylcyclohexanone. Photoinitiators, if used, are customarily used in amounts of from 0.01 to 5% of the weight of the monomers to be polymerized.

The crosslinked polymers are preferably used in partially neutralized form. The degree of neutralization is preferably in the range from 5 to 60 mol %, more preferably in the range from 10 to 40 mol %, particularly preferably in the range from 20 to 30 mol %, based on the monomers containing acid groups. Useful neutralizing agents include alkali metal bases or ammonia/amines. Preference is given to the use of aqueous sodium hydroxide solution, aqueous potassium hydroxide solution or lithium hydroxide. However, neutralization may also be effected using sodium carbonate, sodium bicarbonate, potassium carbonate or potassium bicarbonate or other carbonates or bicarbonates or ammonia. Moreover primary, secondary and tertiary amines may be used.

Alternatively, the degree of neutralization can be set before, during or after polymerization in all apparatuses suitable for this purpose. Neutralization can be effected for example directly in a kneader used for polymerization. Neutralization is preferably carried out before polymerization.

Industrial processes useful for making these products include all processes which are customarily used to make superabsorbers, as described for example in Chapter 3 of "Modern Superabsorbent Polymer Technology", F. L. Buchholz and A. T. Graham, Wiley-VCH, 1998.

Polymerization in aqueous solution is preferably conducted as a gel polymerization. It involves 10-70% strength by weight aqueous solutions of the monomers and optionally of a suitable grafting base being polymerized in the presence of a free-radical initiator by utilizing the Trommsdorff-Norrish effect.

The polymerization reaction may be carried out at from 0 to 150° C., preferably at from 10 to 100° C., not only at atmospheric pressure but also at superatmospheric or reduced pressure. As is customary, the polymerization may also be conducted in a protective gas atmosphere, preferably under nitrogen.

By subsequently heating the polymer gels at from 50 to 130° C., preferably at from 70 to 100° C., for several hours, the performance characteristics of the polymers can be further improved.

The following list relates to particularly preferred conditions for production processes of gels and of dried gels prior to surface postcrosslinking (base polymers). The missing weight percent from 100% are to be made up with water.

Base Polymer 1:
Acrylic acid: 25-40% by weight based on batch size, preferably 28-35% by weight, especially about 31% by weight based on batch size;
NaOH 50%: 22-30 mol % based on acrylic acid, preferably 22-29 mol %, more preferably from 23 to 28 mol %, particularly preferably from 24 to 27 mol %, especially about 25.2 mol % based on acrylic acid, a corresponding neutralization can also be achieved with other neutralizing agents;
polyethylene glycol 400 diacrylate: 0.005-1.0% by weight based on acrylic acid, preferably 0.1-0.4% by weight, particularly preferably 0.15-0.25% by weight, especially about 0.2% by weight based on acrylic acid;
sodium persulfate: 0.2-0.4% by weight based on acrylic acid, preferably 0.25-0.35% by weight, especially about 0.28% by weight based on acrylic acid;
ascorbic acid: 0.005-0.006% by weight based on acrylic acid, preferably 0.0053-0.0058% by weight especially about 0.0056% by weight based on acrylic acid;
sorbitan monococoate: from 0 to 0.1% by weight based on acrylic acid;
useful crosslinkers further include other crosslinkers having at least 2 ethylenically unsaturated double bonds, for example ETMPTA (ethoxylated trimethylolpropane triacrylate (LAROMER® LR 9015 X from BASF AG) in place of the polyethylene glycol 400 diacrylate): 0.2-0.5% by weight based on acrylic acid; what is decisive is that approximately the same degree of crosslinking is achieved.

Useful initiators further include other similarly acting systems or individual components. In the case of radiative initiation, appropriate radiation initiators have to be used.

Temperature at polymerization start: 15-35° C., especially about 25° C.;

The resulting gel 1 is converted by drying into the base polymer 1.

Drying temperature of gel: 120-200° C., preferably 140-180° C., especially about 160° C.

Base Polymer 2:
Acrylic acid: 25-40% by weight based on batch size, preferably 28-35% by weight, especially about 30% by weight based on batch size;
$NaHCO_3$ 23-38% by weight based on acrylic acid, preferably from 27 to 35% by weight, particular preferably from 30 to 33% by weight, especially about 31.5% by weight based on acrylic acid, a corresponding neutralization can also be achieved with other neutralizing agents;
sorbitan monococoate: from 0 to 0.15% by weight based on acrylic acid, preferably 0.02-0.1% by weight, especially about 0.065% by weight based on acrylic acid;
allyl methacrylate: 0.005-1.0% by weight based on acrylic acid, preferably 0.1-0.5% by weight, particularly preferably 0.2-0.4% by weight, especially about 0.3% by weight based on acrylic acid;
2,2'-azobisamidinopropane dihydrochloride: 0-0.2% by weight based on acrylic acid, preferably 0.05-0.1% by weight, especially about 0.08% by weight based on acrylic acid;
potassium peroxodisulfate: 0.01-0.3% by weight based on acrylic acid, preferably 0.1-0.2% by weight, especially about 0.167% by weight based on acrylic acid;
ascorbic acid: 0.005-0.03% by weight based on acrylic acid, preferably 0.01-0.02% by weight especially about 0.015% by weight based on acrylic acid;
useful crosslinkers further include other crosslinkers having at least 2 ethylenically unsaturated double bonds, for example ETMPTA (ethoxylated trimethylolpropane triacrylate (LAROMER® LR 9015 X from BASF AG) or polyethylene glycol 400 diacrylate): 0.2-0.5% by weight based on acrylic acid; what is decisive is that approximately the same degree of crosslinking is achieved.

Useful initiators further include other similarly acting systems or individual components. In the case of radiative initiation, appropriate radiation initiators have to be used.

Maximum temperature during polymerization: 70-100° C., especially about 90° C.;

The resulting gel 2 is converted by drying into the base polymer 2.

Drying temperature of gel: 120-200° C., preferably about 130-150° C., especially about 135° C.

Base Polymer 3:
Acrylic acid: 25-40% by weight based on batch size, preferably 28-35% by weight, especially about 30% by weight based on batch size;
$LiOH \times H_2O$: 15-30% by weight based on acrylic acid, preferably from 17 to 25% by weight, particular preferably from 19 to 23% by weight, epecially about 20.4% by weight based on acrylic acid, a corresponding neutralization can also be achieved with other neutralizing agents;
sorbitan monococoate: from 0 to 0.15% by weight based on acrylic acid, preferably 0.02-0.1% by weight, especially about 0.065% by weight based on acrylic acid;
allyl methacrylate: 0.005-1.0% by weight based on acrylic acid, preferably 0.1-0.6% by weight, particularly preferably 0.3-0.5% by weight, especially about 0.4% by weight based on acrylic acid;

2,2'-azobisamidinopropane dihydrochloride: 0-0.2% by weight based on acrylic acid, preferably 0.05-0.1% by weight, especially about 0.08% by weight based on acrylic acid;

potassium peroxodisulfate: 0.01-0.3% by weight based on acrylic acid, preferably 0.1-0.2% by weight, especially about 0.167% by weight based on acrylic acid;

ascorbic acid: 0.005-0.03% by weight based on acrylic acid, preferably 0.01-0.02% by weight especially about 0.015% by weight based on acrylic acid;

useful crosslinkers further include other crosslinkers having at least 2 ethylenically unsaturated double bonds, for example ETMPTA (ethoxylated trimethylolpropane triacrylate (LAROMER® LR 9015 X from BASF AG) or polyethylene glycol 400 diacrylate): 0.2-0.5% by weight based on acrylic acid; what is decisive is that approximately the same degree of crosslinking is achieved.

Useful initiators further include other similarly acting systems or individual components. In the case of radiative initiation, appropriate radiation initiators have to be used.

Maximum temperature during polymerization: 70-100° C., especially about 90° C.;

The resulting gel 3 is converted by drying into the base polymer 3.

Drying temperature of gel: 120-200° C., preferably about 130-150° C., especially about 140° C.

Base Polymer 4:

Acrylic acid: 15-28% by weight based on batch size, preferably 18-24% by weight, especially about 21% by weight based on batch size;

NaHCO$_3$ 35-55% by weight based on acrylic acid, preferably from 40 to 50% by weight, particular preferably from 43 to 46% by weight, especially about 44.5% by weight based on acrylic acid, a corresponding neutralization can also be achieved with other neutralizing agents;

2-acrylamido-2-methylpropanesulfonic acid: 30-55% by weight based on acrylic acid, preferably from 35 to, 50% by weight, particularly preferably from 41 to 45% by weight, especially about 43% by weight based on acrylic acid;

sorbitan monococoate: from 0 to 0.15% by weight based on acrylic acid, preferably 0.02-0.1% by weight, especially about 0.065% by weight based on acrylic acid;

allyl methacrylate: 0.005-1.0% by weight based on acrylic acid, preferably 0.1-0.6% by weight, particularly preferably 0.3-0.5% by weight, especially about 0.4% by weight based on acrylic acid;

2,2'-azobisamidinopropane dihydrochloride: 0-0.2% by weight based on acrylic acid, preferably 0.05-0.1% by weight, especially about 0.08% by weight based on acrylic acid;

potassium peroxodisulfate: 0.01-0.3% by weight based on acrylic acid, preferably 0.1-0.2% by weight, especially about 0.167% by weight based on acrylic acid;

ascorbic acid: 0.005-0.03% by weight based on acrylic acid, preferably 0.01-0.02% by weight especially about 0.015% by weight based on acrylic acid;

useful crosslinkers further include other crosslinkers having at least 2 ethylenically unsaturated double bonds, for example ETMPTA (ethoxylated trimethylolpropane triacrylate (LAROMER® LR 9015 X from BASF AG) or polyethylene glycol 400 diacrylate): 0.2-0.5% by weight based on acrylic acid; what is decisive is that approximately the same degree of crosslinking is achieved.

Useful initiators further include other similarly acting systems or individual components. In the case of radiative initiation, appropriate radiation initiators have to be used.

Maximum temperature during polymerization: 70-100° C., especially about 90° C.;

The resulting gel 4 is converted by drying into the base polymer 4.

Drying temperature of gel: 120-200° C., preferably about 130-150° C., especially about 140° C.

Base Polymer 5:

Acrylic acid: 20-35% by weight based on batch size, preferably 24-28% by weight, especially about 26% by weight based on batch size;

NaOH 50%: 30-60 mol % based on acrylic acid, preferably from 40 to 55 mol %, particular preferably from 44 to 51 mol %, especially about 45 or 50 mol % based on acrylic acid, a corresponding neutralization can also be achieved with other neutralizing agents;

ETMPTA: 0.005-1.0% by weight on acrylic acid, preferably 0.01-0.4% by weight, particularly preferably 0.03-0.2% by weight, especially about 0.06% by weight based on acrylic acid sodium persulfate: 0.2-0.4% by weight based on acrylic acid, preferably 0.25-0.35% by weight, especially about 0.28% by weight based on acrylic acid;

photoinitiators Darocur 1173: Irgacure 651 (2:1 ratio): 0.005-0.1% by weight based on acrylic acid, preferably 0.01-0.05% by weight especially about 0.024% by weight based on acrylic acid;

useful crosslinkers further include other crosslinkers having at least 2 ethylenically unsaturated double bonds; what is decisive is that approximately the same degree of crosslinking is achieved.

Useful initiators further include other similarly acting systems or individual components, the above-indicated system preferably being initiated using a UV lamp. In the case of thermal initiation, appropriate initiator systems have to be used.

The gel obtained may before drying be optionally additionally treated with 0-0.1% by weight, preferably 0.01-0.05% by weight especially about 0.026% by weight of sodium metabisulphite and with 0-0.1% by weight, preferably 0.01-0.05% by weight, especially about 0.02% by weight of sorbitan monolaurate.

The resulting gel 5 is converted by drying into the base polymer 5.

Drying temperature of gel: 120-200° C., preferably about 130-150° C., especially about 145° C.

Base Polymer 6:

Acrylic acid: 25-40% by weight based on batch size, preferably 28-35% by weight, especially about 30% by weight based on batch size;

NaOH 50%: 30-60 mol % based on acrylic acid, preferably from 40 to 55 mol %, particularly preferably from 48 to 52 mol %, especially about 50 mol % based on acrylic acid, a corresponding neutralization can also be achieved with other neutralizing agents;

polyethylene glycol 400 diacrylate: 0.005-1.1% by weight based on acrylic acid, preferably 0.1-1.0% by weight, particularly preferably 0.3-0.6% by weight, especially about 0.45% by weight based on acrylic acid;

sodium persulfate: 0.2-0.4% by weight based on acrylic acid, preferably 0.25-0.35% by weight, especially about 0.29% by weight based on acrylic acid;

ascorbic acid: 0.005-0.01% by weight based on acrylic acid, preferably 0.006-0.008% by weight especially about 0.007% by weight based on acrylic acid;

sorbitan monococoate: from 0 up to 0.1% by weight based on acrylic acid; especially about 0.08% by weight based on acrylic acid.

Useful crosslinking agents further include other crosslinkers having at least 2 ethylenically unsaturated double bonds, such as for example ETMPTA (ethoxylated trimethylolpropane triacrylate (LAROMER® LR 9015 X from BASF AG) in place of the polyethylene glycol 400 diacrylate): 0.2-0.5% by weight based on acrylic acid; what is decisive is that approximately the same degree of crosslinking is achieved.

Useful initiators further include other similarly acting systems or individual components. In the case of radiative initiation, appropriate radiation initiators have to be used.

Temperature at polymerization start: 15-35° C., especially about 25° C.;

The resulting gel 6 is converted by drying into the base polymer 6.

Drying temperature of gel: 120-200° C., preferably 140-180° C., especially about 160° C.

Not only the gels 1-6 but also the base polymers 1-6 are important intermediates for the preparation of the inventive hydrogel forming polymers capable of absorbing aqueous fluids. The gels and base polymers mentioned in the claims are preferred.

Especial preference is given to a gel prepared by polymerization of partially neutralized acrylic acid with a crosslinking agent, herein (i) the partial neutralization can be effected using NaOH 50%: 20-30 mol % based on acrylic acid, preferably 22-29 mol %, more preferably from 23 to 28 mol %, particularly preferably from 24 to 27 mol %, especially about 25.2 mol % based on acrylic acid, a corresponding neutralization can also be achieved with other neutralizing agents, the crosslinking can be effected using polyethylene glycol 400 diacrylate: 0.005-1.0% by weight based on acrylic acid, preferably 0.1-0.4% by weight, particularly preferably 0.15-0.25% by weight, especially about 0.2% by weight based on acrylic acid;

or some other crosslinker which produces the same degree of crosslinking, or (ii) the partial neutralization can be effected using NaHCO$_3$: 23-28% by weight based on acrylic acid, preferably from 27 to 35% by weight, particularly preferably from 30 to 33% by weight, especially about 31.5% by weight based on acrylic acid, a corresponding neutralization can also be achieved with other neutralizing agents, the crosslinking can be effected using allyl methacrylate: 0.005-1.0% by weight based on acrylic acid, preferably 0.1-0.5% by weight, particularly preferably 0.2-0.4% by weight, especially about 0.3% by weight based on acrylic acid;

or some other crosslinker which produces the same degree of crosslinking, or (iii) the partial neutralization can be effected using LiOH× H$_2$O: 15-30% by weight based on acrylic acid, preferably from 17 to 25% by weight, particularly preferably from 19 to 23% by weight, especially about 20.4% by weight based on acrylic acid, a corresponding neutralization can also be achieved with other neutralizing agents, the crosslinking can be effected using allyl methacrylate: 0.005-1.0% by weight based on acrylic acid, preferably 0.1-0.6% by weight, particularly preferably 0.3-0.5% by weight, especially about 0.4% by weight based on acrylic acid;

or some other crosslinker which produces the same degree of crosslinking, or (iv) the partial neutralization can be effected using NaHCO$_3$: 35-55% by weight based on acrylic acid, preferably from 40 to 50% by weight, particularly preferably from 43 to 46% by weight, especially about 44.5% by weight based on acrylic acid, a corresponding neutralization can also be achieved using other neutralizing agents when 2-acrylamido-2-methylpropanesulfonic acid is present at 30-55% by weight based on acrylic acid, preferably from 35 to 50% by weight, particularly preferably from 41 to 45% by weight, especially about 43% by weight based on acrylic acid additionally to acrylic acid, the crosslinking can be effected using allyl methacrylate: 0.005-1.0% by weight based on acrylic acid, preferably 0.1-0.6% by weight, particularly preferably 0.3-0.5% by weight, especially about 0.4% by weight based on acrylic acid, or some other crosslinker which produces the same degree of crosslinking or (V) the partial neutralization can be effected using NaOH 50%: 30-60 mol % based on acrylic acid, preferably from 40 to 55 mol %, particularly preferably from 45 to 51 mol %, especially about 45 or 50 mol % based on acrylic acid, a corresponding neutralization can also be achieved with other neutralizing agents, the crosslinking can be effected using ETMPTA: 0.005-1.0% by weight based on acrylic acid, preferably 0.1-0.4% by weight, particularly preferably 0.03-0.2% by weight, especially about 0.06% by weight based on acrylic acid; or some other crosslinker which produces the same degree of crosslinker, or (vi) the partial neutralization can be effected using NaOH 50%: 30-60 mol % based on acrylic acid, preferably from 40 to 55 mol %, particularly preferably from 48 to 52 mol %, especially about 50 mol % based on acrylic acid, a corresponding neutralization can also be achieved with other neutralizing agents, the crosslinking can be effected using polyethylene glycol 400 diacrylate: 0.005-1.1% by weight based on acrylic acid, preferably 0.1-1.0% by weight, particularly preferably 0.3-0.6% by weight, especially about 45% by weight, based on acrylic acid, or some other crosslinker which produces the same degree of crosslinking.

The abovementioned gels are converted by drying at 120° C.-200° C. into the base polymers according to the present invention. The water content is then preferably below 5% by weight and especially below 3% by weight. The base polymers can be converted by the hereinbelow preferred surface postcrosslinking conditions into the corresponding superabsorbents, the conditions indicated for each base polymer being preferred for the specific base polymer.

a) Surface Postcrosslinking

Preference is given to hydrogel forming polymers which have been surface-postcrosslinked. Surface postcrosslinking may be carried out in a conventional manner using dried, ground and classified polymer particles.

To effect surface postcrosslinking, compounds capable of reacting with the functional groups of the polymers by crosslinking are applied to the surface of the hydrogel particles, preferably in the form of an aqueous solution. The aqueous solution may contain water-miscible organic solvents. Suitable solvents are alcohols such as methanol, ethanol, i-propanol ethylene glycol, propylene glycol or acetone.

The subsequent crosslinking reacts polymers which have been prepared by the polymerization of the abovementioned monoethylenically unsaturated acids and optionally monoethylenically unsaturated comonomers and which have a molecular weight of greater than 5 000, preferably greater than 50 000, with compounds which have at least two groups reactive toward acid groups. This reaction can take place at room temperature or else at elevated temperatures up to 220° C.

Suitable postcrosslinkers include for example:
di- or polyglycidyl compounds such as diglycidyl phosphonates or ethylene glycol diglycidyl ether, bischlorohydrin ethers of polyalkylene glycols,
alkoxysilyl compounds,
polyaziridines, aziridine compounds based on polyethers or substituted hydrocarbons, for example bis-N-aziridinomethane,
polyamines or polyamidoamines and their reaction products with epichlorohydrin,
polyols such as ethylene glycol, 1,2-propanediol, 1,4-butanediol, glycerol, methyltriglycol, polyethylene glycols having an average molecular weight $M_w$ of 200-10 000, di- and polyglycerol, pentaerythritol, sorbitol, the ethoxylates of these polyols and their esters with carboxylic acids or carbonic acid such as ethylene carbonate or propylene carbonate,
carbonic acid derivatives such as urea, thiourea, guanidine, dicyandiamide, 2-oxazolidinone and its derivatives, bisoxazoline, polyoxazolines, di- and polyisocyanates,
di- and poly-N-methylol compounds such as, for example, methylenebis(N-methylolmethacrylamide) or melamine-formaldehyde resins,
compounds having two or more blocked isocyanate groups such as, for example, trimethylhexamethylene diisocyanate blocked with 2,2,3,6-tetramethylpiperidin-4-one.

If necessary, acidic catalysts may be added, for example p-toluenesulfonic acid, phosphoric acid, boric acid or ammonium dihydrogenphosphate.

Particularly suitable postcrosslinkers are di- or polyglycidyl compounds such as ethylene glycol diglycidyl ether, the reaction products of polyamidoamines with epichlorohydrin and 2-oxazolidinone.

The crosslinker solution is preferably applied by spraying with a solution of the crosslinker in conventional reaction mixers or mixing and drying equipment such as Patterson-Kelly mixers, DRAIS turbulence mixers, Lödige mixers, screw mixers, plate mixers, fluidized bed mixers and Schugi Mix. The spraying of the crosslinker solution may be followed by a heat treatment step, preferably in a downstream dryer, at from 80 to 230° C., preferably 80-190° C., particularly preferably at from 100 to 160° C., for from 5 minutes to 6 hours, preferably from 10 minutes to 2 hours, particularly preferably from 10 minutes to 1 hour, during which not only cracking products but also solvent fractions can be removed. But the drying may also take place in the mixer itself, by heating the jacket or by blowing in a preheated carrier gas.

In a particularly preferred embodiment of the invention, the hydrophilicity of the particle surface of the hydrogel-forming polymer is additionally modified by formation of complexes. The formation of complexes on the outer shell of the hydrogel particles is effected by spraying with solutions of divalent or more highly valent metal salt solutions, and the metal cations can react with the acid groups of the polymer to form complexes. Examples of divalent or more highly valent metal cations are $Mg^{2+}$, $Ca^{2+}$, $Al^{3+}$, $Sc^{3+}$, $Ti^{4+}$, $Mn^{2+}$, $Fe^{2+/3+}$, $Co^{2+}$, $Ni^{2+}$, $Cu^{+/2+}$, $Zn^{2+}$, $Y^{3+}$, $Zr^{4+}$, $Ag^{+}$, $La^{3+}$, $Ce^{4+}$, $Hf^{4+}$, and $Au^{+/3+}$, preferred metal cations are $Mg^{2+}$, $Ca^{2+}$, $Al^{3+}$, $Ti^{4+}$, $Zr^{4+}$ and $La^{3+}$, and particularly preferred metal cations are $Al^{3+}$, $Ti^{4+}$ and $Zr^{4+}$. The metal cations may be used not only alone but also mixed with each other. Of the metal cations mentioned, all metal salts are suitable that possess adequate solubility in the solvent to be used. Of particular suitability are metal salts with weakly complexing anions such as for example chloride, nitrate and sulfate. Useful solvents for the metal salts include water, alcohols, DMF, DMSO and also mixtures thereof. Particular preference is given to water and water-alcohol mixtures such as for example water-methanol or water-1,2-propanediol.

The spraying of the metal salt solution onto the particles of the hydrogel-forming polymer may be effected not only before but also after the surface postcrosslinking of the particles. In a particularly preferred process, the spraying of the metal salt solution takes place in the same step as the spraying with the crosslinker solution, the two solutions being sprayed separately in succession or simultaneously via two nozzles or the crosslinker and metal salt solutions may be sprayed conjointly through a single nozzle.

Optionally, the hydrogel-forming polymers may be further modified by admixture of finely divided inorganic solids, for example silica, alumina, titanium dioxide and iron(II) oxide, to further augment the effects of the surface after treatment. Particular preference is given to the admixture of hydrophilic silica or of alumina having an average primary particle size of from 4 to 50 nm and a specific surface area of 50-450 $m^2/g$. The admixture of finely divided inorganic solids preferably takes place after the surface modification through crosslinking/complexing, but may also be carried out before or during these surface modifications.

The following list relates to particularly preferred postcrosslinking conditions of dried gels according to the invention, especially to particularly preferred postcrosslinking conditions of base polymer 1:
ethylene glycol diglycidyl ether: 0.01-0.12% by weight based on dried gel (base polymer), preferably 0.012-0.02% by weight, especially about 0.015% by weight based on base polymer;
water: 1.5-5% by weight based on base polymer, preferably 1.6-2% by weight, especially about 1.67% by weight based on base polymer;
sorbitan monococoate: 0-0.1% by weight based on base polymer, preferably 0.03-0.07% by weight, especially about 0.05% by weight based on base polymer;
heat treatment jacket temperature: 120-180° C., preferably 140-160° C., especially 150° C.; heat treatment residence time has to be conformed to the temperature, higher temperatures involving shorter residence times and longer residence times giving rise to more pronounced postcrosslinking. Typical values are 150-10. minutes, especially about 120 minutes.
ethylene glycol diglycidyl ether: 0.01-0.12% by weight based on dried gel (base polymer), preferably 0.08-0.11% by weight, especially about 0.10% by weight based on base polymer;
water: 0.5-5% by weight based on base polymer, preferably 1-2% by weight, especially about 1.5% by weight based on base polymer;
1,2-propanediol: 0-3.5% by weight based on base polymer, preferably 0.5-1.5% by weight, especially about 0.8% by weight based on base polymer;
aluminum sulfate (as 26.8% solution for example): 0-0.15% by weight based on base polymer, preferably 0.03-0.10% by weight, especially about 0.075% by weight based on base polymer;
heat treatment jacket temperature: 120-180° C., preferably 140-160° C., especially 150° C.; heat treatment residence time has to be conformed to the temperature, higher temperatures involving shorter residence times and longer residence times giving rise to more pronounced postcrosslinking. Typical values are 150-10 minutes, especially about 15 minutes.

ethylene glycol diglycidyl ether: 0.01-0.12% by weight based on dried gel (base polymer), preferably 0.08-0.11% by weight, especially about 0.10% by weight based on base polymer;

water: 0.5-5% by weight based on base polymer, preferably 1-2% by weight, especially about 1.67% by weight based on base polymer;

heat treatment jacket temperature: 120-180° C., preferably 140-160° C., especially 150° C.; heat treatment residence time has to be conformed to the temperature, higher temperatures involving shorter residence times and longer residence times giving rise to more pronounced postcrosslinking. Typical values are 150-10 minutes, especially about 15 minutes.

The longer the postcrosslinking time, the higher the resultant AUL, although CRC decreases somewhat.

The following list relates to particularly preferred postcrosslinking conditions of dried gels according to the invention, especially to particularly preferred postcrosslinking conditions of base polymer 2:

oxazolidinone: 0.005-0.1% by weight based on dried gel (base polymer), preferably 0.01-0.05% by weight, especially about 0.025% by weight based on base polymer;

water: 0.5-5% by weight based on base polymer, preferably 1-3% by weight, especially about 2% by weight based on base polymer;

1,2-propanediol: 0-4% by weight based on base polymer, preferably 0.5-3% by weight, especially about 2% by weight based on base polymer;

aluminum sulfate×8H$_2$O: 0-0.3% by weight based on base polymer, preferably 0.03-0.10% by weight, especially about 0.05% by weight based on base polymer;

heat treatment jacket temperature: 120-180° C., preferably 140-160° C., especially 150° C.; heat treatment residence time has to be conformed to the temperature, higher temperatures involving shorter residence times and longer residence times giving rise to more pronounced postcrosslinking. Typical values are 150-10 minutes, preferably 90-20 minutes, especially about 30, 60 or 70 minutes.

The following list relates to particularly preferred postcrosslinking conditions of dried gels according to the invention, especially to particularly preferred postcrosslinking conditions of base polymer 3:

ethylene glycol diglycidyl ether: 0.005-0.12% by weight based on dried gel (base polymer), preferably 0.01-0.05% by weight, especially about 0.03% by weight based on base polymer;

water: 0.5-5% by weight based on base polymer, preferably 2-4% by weight, especially about 3.35% by weight based on base polymer;

1,2-propanediol: 0-4% by weight based on base polymer, preferably 0.5-3% by weight, especially about 1.6% by weight based on base polymer;

aluminum sulfate: 0-0.3% by weight based on base polymer, preferably 0.05-0.10% by weight, especially about 0.075% by weight based on base polymer;

heat treatment circulating air drying cabinet temperature: 80-180° C., preferably 9.0-120° C., especially about 100° C.; heat treatment residence time has to be conformed to the temperature, higher temperatures involving shorter residence times and longer residence times giving rise to more pronounced postcrosslinking. Typical values are 180-20 minutes, preferably 150-90 minutes, especially about 120 minutes.

The following list relates to particularly preferred postcrosslinking conditions of dried gels according to the invention, especially to particularly preferred postcrosslinking conditions of base polymer 4:

ethylene glycol diglycidyl ether: 0.005-0.3% by weight based on dried gel (base polymer), preferably 0.05-0.1% by weight, especially about 0.075% by weight based on base polymer or preferably 0.1-0.3% by weight, especially about 0.2% by weight based on base polymer;

water: 0.5-5% by weight based on base polymer, preferably 1-3% by weight, especially about 2% by weight or 2.3% by weight based on base polymer;

1,2-propanediol: 0-4% by weight based on base polymer, preferably 1-3% by weight, especially about 2% by weight or 1.2% by weight based on base polymer;

aluminum sulfate: 0-0.3% by weight based on base polymer, preferably 0.05-0.10% by weight, especially about 0.075% by weight based on base polymer;

heat treatment circulating air drying cabinet temperature: 80-180° C., preferably 100-160° C., especially about 140° C.; heat treatment residence time has to be conformed to the temperature, higher temperatures involving shorter residence times and longer residence times giving rise to more pronounced postcrosslinking. Typical values are 180-20 minutes, preferably 150-90 minutes, especially about 120 minutes.

The following list relates to particularly preferred postcrosslinking conditions of dried gels according to the invention, especially to particularly preferred postcrosslinking conditions of base polymer 5:

ethylene glycol diglycidyl ether: 0.005-0.2% by weight based on dried gel (base polymer), preferably 0.03-0.1% by weight, especially about 0.06% by weight based on base polymer;

water: 0.5-5% by weight based on base polymer, preferably 1-3% by weight, especially about 2.5% by weight based on base polymer;

1,2-propanediol: 0-4% by weight based on base polymer, preferably 0.5-3% by weight, especially about 1.5% by weight based on base polymer;

heat treatment circulating air drying cabinet temperature: 80-180° C., preferably 100-160° C., especially about 145° C.; heat treatment residence time has to be conformed to the temperature, higher temperatures involving shorter residence times and longer residence times giving rise to more pronounced postcrosslinking. Typical values are 180-20 minutes, preferably 90-30 minutes, especially about 60 minutes.

The following list relates to particularly preferred postcrosslinking conditions of dried gels according to the invention, especially to particularly preferred postcrosslinking conditions of base polymer 6:

ethylene glycol diglycidyl ether: 0.01-0.12% by weight based on dried gel (base polymer), preferably 0.04-0.08% by weight, especially about 0.06% by weight based on base polymer;

water: 0.5-5% by weight based on base polymer, preferably 2-4% by weight, especially about 3.2% by weight based on base polymer;

1,2-propanediol: 0-4% by weight based on base polymer, preferably 2% by weight, especially about 1.6% by weight based on base polymer 2;

heat treatment circulating air drying cabinet temperature: 120-180° C., preferably 140-160° C., especially 150° C.; heat treatment residence time has to be conformed to the temperature, higher temperatures involving shorter residence times and longer residence times giving rise to more pronounced postcrosslinking. Typical values are 150-10 minutes, especially about 120 minutes.

The longer the postcrosslinking time, the higher the resultant AUL, although CRC decreases somewhat.

Properties of acidic hydrogel forming polymers according to the invention

The inventive acidic hydrogel forming polymers capable of absorbing aqueous fluids have a particle size distribution which is generally in the range from 10 µm to about 1000 µm, preferably in the range from about 100 µm to about 850 µm and especially in the range from 150 µm to about 700 µm. The size windows mentioned preferably include more than 80% by weight and especially more than 90% by weight of the particles.

The inventive acidic hydrogel forming polymers capable of absorbing aqueous fluids comprise improved odor control properties as well as high ultimate absorption capacity, high gel strength and permeability and also high retention. Owing to the presence of acidic hydrogel forming polymers, the products of the invention have antimicrobial properties, thereby providing an odor control system without the need for the addition of odor inhibiting substances or odor masking materials.

In contrast to the prior art, where an added odor control unit is indispensable for the use of superabsorbent polymers in the hygiene sector, the products of the invention permit substantially less costly manufacture, since as well as there being no need for an odor control unit there is no need either for binders or other aids for binding an odor control unit to hydrogel forming polymers.

The reduction or preferably the elimination of additives for odor control purposes results in no changes to the high absorption performance and no changes to the excellent absorption behavior of the hydrogel forming polymer material used. This in turn provides longer wear times when the products of the invention are used in a hygiene article. Skin sensitization and irritation is completely avoided and eliminated by a constant pH medium.

The pH of the hydrogel forming polymers according to the invention can be measured by the methods indicated in the description part and is 5.7 or less, especially 5.6, 5.5, 5.4, 5.3, 5.2 or 5.1 and less, preferably 5.0 especially 4.9, 4.8, 4.7 4.6 and less, particularly preferably 4.5; the lower limit is particularly preferably 4.4 especially 4.3, 4.2 or 4.1, preferably 4.0 especially.3.9, 3.8, 3.7, 3.6, 3.5, 3.4, 3.3, 3.2, 3.1 or 3.0, preference being given to combinations of the upper and lower limits, for example pH values in the range from 3 to 5.7, preferably in the range from 4 to 5.5 and particularly preferably in the range from 4.4 to 4.6 or from 5.1 to 5.3.

The SFC value [in $10^{-7}$ cm$^3$s/g] of the hydrogel forming polymers according to the invention can be measured by the methods indicated in the description part and is preferably above 1, especially 2, 4, 6, 8, 10, 12, 14, 16, 18, 20 or higher, particularly preferably 22, especially 24, 26, 28, 30, 32 or higher.

The CRC value [g/g] of the hydrogel forming polymers according to the invention can be measured by the methods indicated in the description part and is preferably above 15, especially 16, 18, 20, 22, 24, or higher, particularly preferably 25, especially 26, 27, 28, 29, 30, 31, 32 or higher.

The AUL-0.7 psi value [g/g] of the hydrogel forming polymers according to the invention can be measured by the methods indicated in the description part and is preferably above 4, especially 6, 8, 10, 12, or higher, particularly preferably 13, especially 14, 15, 16, 17, 18, 19, 20, 21, 22, 23, 24, 25, 26, 27, 28, or higher.

The pH$_{AI}$ value of the hydrogel forming polymers according to the invention can be measured and calculated by the methods indicated in the description part and is at least 80 or higher, especially 81, 82, 83, 84, 85, 86, 87, 88, 90 or higher, preferably above 91, especially 92, 93, 94, 95, 96, 97, 98, 99, 100, 101, 102, 103, 104, 105, 106, 107, 108, 109, 110, 111, 112, 113, 114, 115, 116, 117 118, 119, 120 or higher.

The Nessler value (measured as $N_2$ from $NH_3$ in mg/l compared with $N_2$ from $NH_3$ of Example 9. The $N_2$ value of Example 9 is set at 100%. The hydrogel forming polymer according to the invention can be measured and calculated by the methods indicated in the description part and is at most 65% or less, especially 60%, 55%, 50% of the value of HySorb C 7015® or less, preferably less than 45%, especially 40%, 39%, 38%, 37%, 36%, 35%, 34%, 33%, 32%, 31%, 30%, 29%, 28%, 27%, 26%, 25%, 24%, 23%, 22%, 21%, 20% or less.

Particular preference is given to a combination of the threshold values, for example pH$_{AI}$ with pH, pH$_{AI}$ with SFC, pH$_{AI}$ with CRC, pH$_{AI}$ with AUL, pH$_{AI}$ with Nessler, especially triple combinations such as pH$_{AI}$ with pH and SFC, pH$_{AI}$ with pH and CRC, pH$_{AI}$ with pH and AUL, pH$_{AI}$ with Nessler and SFC, pH$_{AI}$ with Nessler and CRC, pH$_{AI}$ with Nessler and AUL.

Use of Acidic Hydrogel Forming Polymers

The present invention further provides for the use of the abovementioned hydrogel forming polymers in hygiene articles comprising (A) a liquid pervious topsheet
(B) a liquid impervious backsheet
(C) a core positioned between (A) and (B) and comprising
  10-100% by weight of the hydrogel forming polymer according to the invention
  0-90% by weight of hydrophilic fiber material
    preferably 20-100% by weight of the inventive hydrogel forming polymer, 0-80% by weight of hydrophilic fiber. material
    more preferably 30-100% by weight of the inventive hydrogel forming polymer, 0-70% by weight of hydrophilic fiber material
    even more preferably 40-100% by weight of the inventive hydrogel forming polymer, 0-60% by weight of hydrophilic fiber material
    much more preferably 50-100% by weight of the inventive hydrogel forming polymer, 0-50% by weight of hydrophilic fiber material
    particularly preferably 60-100% by weight of the inventive forming polymer, 0-40% by weight of the hydrophilic fiber material
    especially preferably 70-100% by weight of the inventive hydrogel forming polymer, 0-30% by weight of the hydrophilic fiber material
    extremely preferably 80-100% by weight of the inventive hydrogel forming polymer, 0-20% by weight of the hydrophilic fiber material
    most preferably 90-100% by weight of the inventive hydrogel forming polymer, 0-10% by weight of the hydrophilic fiber material
(D) optionally a tissue layer positioned directly above and below said core (C) and
(E) optionally an acquisition layer positioned between (A) and (C).

The percentages are to be understood so that in the case of 10-100% by weight 11, 12, 13, 14, 15, 16, 17, 18, 19 up to in each case 100% by weight of hydrogel forming polymer according to the invention and all in between % ages (for example 12.2%) are possible and correspondingly hydrophilic fiber material from 0 to respectively 89, 88, 87, 86, 85, 83, 82, 81% by weight and in between percentages (for example 87.8%) are possible. When further materials are present in the core, then the percentages of polymer and fiber are reduced accordingly. The same applies to the preferred ranges, for example in the case of extremely preferably 81, 82, 83, 84, 85, 86, 87, 88, 89% by weight can be present for the hydrogel forming polymer of the invention and correspondingly 19, 18, 17, 16, 15, 14, 13, 12, 11% by weight of the fiber material. So the preferred range contains 20, 21, 22, 23, 24, 25, 26, 27, 28, 29 to 100% by weight of hydrogel forming polymer according to the invention, the more preferred range 30, 31, 32, 33, 34, 35, 36, 37, 38, 39 to 100% by weight of hydrogel forming polymer according to the invention, the even more preferred range 40, 41, 42, 43, 44, 45, 46, 47, 48, 49 to 100% by weight of hydrogel forming polymer according to the invention, the much more preferred range 50, 51, 52, 53, 54, 55, 56, 57, 58, 59 to 100% by weight of hydrogel forming polymer according to the invention, the particularly preferred range 60, 61, 62, 63, 64, 65, 66, 67, 68, 69 to 100% by weight of hydrogel forming polymer according to the invention, the especially preferred range 70, 71, 71, 72, 73, 74, 75, 76, 77, 78, 79 to 100% by weight of hydrogel forming polymer according to the invention and the most preferred range 90, 91, 92, 93, 94, 95, 96, 97, 98, 99 or 1.00% by weight of hydrogel forming polymer according to the invention.

Hygiene articles for the purposes of the present invention include not only incontinence pads and incontinence briefs for adults but also diapers for infants.

The liquid pervious topsheet (A) is the layer which is in direct contact with the skin of the wearer. Its material comprises customary synthetic or manufactured fibers or films of polyesters, polyolefins, rayon or natural fibers such as cotton. In the case of non-woven materials the fibers are generally joined together by binders such as polyacrylates. Preferred materials are polyesters, rayon or blends thereof, polyethylene and polypropylene. Examples of liquid pervious layers are described in WO 99/57355 A1, EP 102 388 3 A2.

The liquid impervious layer (B) is generally a sheet of polyethylene or polypropylene.

The core (C) includes not only the hydrogel forming polymer of the invention but also hydrophilic fiber material. By hydrophilic is meant that aqueous fluids spread quickly over the fiber. The fiber material is usually a cellulose, modified cellulose, rayon, polyester such as polyethylene terephthlate. Particular preference is given to cellulose fibers such as pulp. The fibers generally have a diameter of 1-200 μm, and preferably 10-100 μm, and also have a minimum length of 1 mm.

Diaper construction and shape is common knowledge and described for example in WO 95/26 209 page 66 line 34 to page 69 line 11, DE 196 04 601 A1, EP-A-0 316 518 and EP-A-0 202 127. Diapers and other hygiene articles are generally also described in WO 00/65084, especially at pages 6-15, WO 00/65348, especially at pages 4-17, WO 00/35502, especially pages 3-9, DE 19737434, WO 98/8439. Hygiene articles for femcare are described in the following references. The inventive hydrogel forming polymers capable of absorbing aqueous fluids can be used therein. Femcare references: WO 95/24173: Absorption Article for Controlling Odour, WO 91/11977: Body Fluid Odour Control, EP 389023: Absorbent Sanitary-Articles, WO 94/25077: Odour Control Material, WO 97/01317: Absorbent Hygienic Article, WO 99/18905, EP 834297, U.S. Pat. No. 5,762,644, U.S. Pat. No. 5,895,381, WO 98/57609, WO 2000/065083, WO 2000/069485, WO 2000/069484, WO 2000/069481, U.S. Pat. No. 6,123,693, EP 1104666, WO 2001/024755, WO 2001/ 000115, EP 105373, WO 2001/041692, EP 1074233. Tampons are described in the following references: WO 98/48753., WO 98/41179, WO 97/09022, WO 98/46182, WO 98/46181, WO 2001/043679, WO 2001/043680, WO 2000/061052, EP 1108408, WO 2001/033962, DE 200020662, WO 2001/001910, WO 2001/001908, WO 2001/001909, WO 2001/001906, WO 2001/001905, WO 2001/24729. Incontinence articles are described in the following references: Disposable Absorbent Article for Incontinent Individuals: EP 311344 description pages 3-9; Disposable Absorbent Article: EP 850623; Absorbent Article: WO 95/26207; Absorbent Article: EP 894502; Dry Laid Fibrous Structure: EP 850 616; WO 98/22063; WO 97/49365; EP 903134; EP 887060; EP 887059; EP 887058; EP 887057; EP 887056; EP 931530; WO 99/25284; WO 98/48753. Femcare and incontinence articles are described in the following references: Catamenial Device: WO 93/22998 description pages 26-33; Absorbent Members for Body Fluids: WO 95/26209 description pages 36-69; Disposable Absorbent Article: WO 98/20916 description pages 13-24; Improved Composite Absorbent Structures: EP 306262 description pages 3-14; Body Waste Absorbent Article: WO 99/45973. These references and the references therein are hereby expressly incorporated herein.

The acidic hydrogel forming polymers of the invention are very useful as absorbents for water and aqueous fluids, so that they may be used with advantage as a water retainer in market gardening, as a filter aid and particularly as an absorbent component in hygiene articles such as diapers, tampons or sanitary napkins.

Incorporation and Fixation of the Highly Swellable Hydrogels According to the Present Invention In addition to the above-described highly swellable hydrogels, the absorbent composition of the present invention includes constructions which include highly swellable hydrogels or to which they are fixed. Any construction is suitable that is capable of accommodating highly swellable hydrogels and of being integrated into the absorption layer. A multiplicity of such compositions is already known and described in detail in the literature. A construction for installing the highly swellable hydrogels can be for example a fiber matrix consisting of a cellulose fiber mixture (air-laid web, wet laid web) or synthetic polymer fibers (meltblown web, spunbonded web) or else of a fiber blend of cellulose fibers and synthetic fibers. Possible fiber materials are detailed in the chapter which follows. The air-laid web process is described for example in WO 98/28 478. Furthermore, open-celled foams or the like may be used to install highly swellable hydrogels.

Alternatively, such a construction can be the result of fusing two individual layers to form one or better a multiplicity of chambers which contain the highly swellable hydrogels. Such a chamber system is described in detail in EP 0 615 736 A1 page 7 lines 26 et seq.

In this case, at least one of the two layers should be water pervious. The second layer may either be water pervious or water impervious. The layer material used may be tissues or other fabric, closed or open-celled foams, perforated films, elastomers or fabrics composed of fiber material. When the absorbent composition consists of a construction of layers, the layer material should have a pore structure whose pore dimensions are small enough to retain the highly swellable hydrogel particles. The above examples of the construction of the absorbent composition also include laminates composed of at least two layers between which the highly swellable hydrogels are installed and fixed.

Generally it is possible to fix hydrogel particles within the absorbent core to improve dry and wet integrity. Dry and wet integrity describes the ability to install highly swellable hydrogels into the absorbent composition in such a way that they withstand external forces not only in the wet but also in the dry state and highly swellable polymer does not dislocate or spill out. The forces referred to are especially mechanical stresses as occur in the course of moving about while wearing the hygiene article or else the weight pressure on the hygiene article in the case of incontinence especially. As to fixation, one skilled in the art knows a multiplicity of possibilities. Examples such as fixation by heat treatment, addition of adhesives, thermoplastics, binder materials are noted in WO 95/26 209 page 37 line 36 to page 41 line 14. The cited passage is thus part of this invention. Methods for enhancing wet strength are also to be found in WO 2000/36216 A1.

Furthermore, the absorbent composition may comprise a base material, for example a polymer film on which the highly swellable hydrogel particles are fixed. The fixing may be effected not only on one side but also on both sides. The base material can be water pervious or water impervious.

The above constructions of the absorbent composition incorporate the highly swellable hydrogels at a weight fraction of from 10 to 100% by weight, preferably 20-100% by weight, more preferably 30-100% by weight, even more preferably 40-100% by weight, much more preferably 50-100% by weight, particularly preferably 60-100% by weight, especially preferably 70-100% by weight, extremely preferably 80-100% by weight and most preferably 90-100% by weight, based on the total weight of the construction and of the highly swellable hydrogels.

Fiber Materials of the Absorbent Composition

The structure of the present composition according to the invention may be based on various fiber materials, which are used as a fiber network or matrices. The present invention includes not only fibers of natural origin (modified or unmodified) but also synthetic fibers.

A detailed overview of examples of fibers which can be used in the present invention is given in WO 95/26 209 page 28 line 9 to page 36 line 8. The cited passage is thus part of this invention.

Examples of cellulose fibers include cellulose fibers which are customarily used in absorption products, such as fluff pulp and cellulose of the cotton type. The materials (soft- or hardwoods), production processes such as chemical pulp, semichemical pulp, chemothermomechanical pulp (CTMP) and bleaching processes are not particularly restricted. For instance, natural cellulose fibers such as cotton, flax, silk, wool, jute, ethylcellulose and cellulose acetate are used.

Suitable synthetic fibers are produced from polyvinyl chloride, polyvinyl fluoride, polytetrafluoroethylene, polyvinylidene chloride, polyacrylic compounds such as ORLON®, polyvinyl acetate, polyethyl vinyl acetate, soluble or insoluble polyvinyl alcohol. Examples of synthetic fibers include thermoplastic polyolefin fibers, such as polyethylene fibers (PULPEX®), polypropylene fibers and polyethylene-polypropylene bicomponent fibers, polyester fibers, such as polyethylene terephthalate fibers (DACRON® or KODEL®), copolyesters, polyvinyl acetate, polyethyl vinyl acetate, polyvinyl chloride, polyvinylidene chloride, polyacrylics, polyamides, copolyamides, polystyrene and copolymers of the aforementioned polymers and also bicomponent fibers composed of polyethylene terephthalate-polyethylene-isophthalate copolymer, polyethyl vinyl acetate/polypropylene, polyethylene/polyester, polypropylene/polyester, copolyester/polyester, polyamide fibers (nylon), polyurethane fibers, polystyrene fibers and polyacrylonitrile fibers. Preference is given to polyolefin fibers, polyester fibers and their bicomponent fibers. Preference is further given to thermally adhesive bicomponent fibers composed of polyolefin of the core-sheath type and side-by-side type on account of their excellent dimensional stability following fluid absorption.

The synthetic fibers mentioned are preferably used in combination with thermoplastic fibers. In the course of the heat treatment, the latter migrate to some extent into the matrix of the fiber material present and so constitute bond sites and renewed stiffening elements on cooling. Additionally the addition of thermoplastic fibers means that there is an increase in the present pore dimensions after the heat treatment has taken place. This makes it possible, by continuous addition of thermoplastic fibers during the formation of the absorbent core, to continuously increase the fraction of thermoplastic fibers in the direction of the topsheet, which results in a similarly continuous increase in the pore sizes. Thermoplastic fibers can be formed from a multiplicity of thermoplastic polymers which have a melting point of less than 190° C., preferably in the range from 75° C. to 175° C. These temperatures are too low for damage to the cellulose fibers to be likely.

Lengths and diameters of the above-described synthetic fibers are not particularly restricted, and generally any fiber from 1 to 200 mm in length and from 0.1 to 100 denier (gram per 9 000 meters) in diameter may preferably be used. Preferred thermoplastic fibers are from 3 to 50 mm in length, particularly preferred thermoplastic fibers are from 6 to 12 mm in length. The preferred diameter for the thermoplastic fiber is in the range from 1.4 to 10 decitex, and the range from 1.7 to 3.3 decitex (gram per 10 000 meters) is particularly preferred. The form of the fiber may vary; examples include woven types, narrow cylindrical types, cut/chopped yarn types, staple fiber types and continuous filament fiber types.

The fibers in the absorbent composition of the present invention can be hydrophilic and/or hydrophobic. According to the definition of Robert F. Gould in the 1964 American Chemical Society publication "Contact angle, wettability and adhesion", a fiber is referred to as hydrophilic when the contact angle between the liquid and the fiber (or the fiber surface) is less than 90° or when the liquid tends to spread spontaneously on the same surface. The two processes are generally coexistent. Conversely, a fiber is termed hydrophobic when a contact angle of greater than 90° is formed and no spreading is observed.

Preference is given to using hydrophilic fiber material. Particular preference is given to using fiber material which is weakly hydrophilic on the body side and most hydrophilic in the region surrounding the highly swellable hydrogels. In the manufacturing process, layers having different hydrophilicities are used to create a gradient which channels impinging fluid to the hydrogel, where it is ultimately absorbed.

Suitable hydrophilic fibers for use in the absorbent composition of the present invention include for example cellulose fibers, modified cellulose fibers, rayon, polyester fibers, for example polyethylene terephthalate (DACRON®), and hydrophilic nylon (HYDROFIL®). Suitable hydrophilic fibers may also be obtained by hydrophilicizing hydrophobic fibers, for example the treatment of thermoplastic fibers obtained from polyolefins (e.g. polyethylene or polypropylene, polyamides, polystyrenes, polyurethanes, etc.) with surfactants or silica. However, for cost reasons and ease of availability, cellulosic fibers are preferred.

The highly swellable hydrogel particles are embedded into the fiber material described. This can be done in various ways, for example by using the hydrogel material and the fibers together to create an absorbent layer in the form of a matrix, or by incorporating highly swellable hydrogels into fiber mixture layers, where they are ultimately fixed, whether by means of adhesive or lamination of the layers.

The fluid-acquiring and -distributing fiber matrix may comprise synthetic fiber or cellulosic fiber or a mixture of synthetic fiber and cellulosic fiber, in which case the mixing ratio may vary from (100 to 0) synthetic fiber: (0 to 100) cellulosic fiber. The cellulosic fibers used may additionally have been chemically stiffened to increase the dimensional stability of the hygiene article.

The chemical stiffening of cellulosic fibers may be provided in different ways. A first way of providing fiber stiffening is by adding suitable coatings to the fiber material. Such additives include for example polyamide-epichlorohydrin coatings (Kymene® 557 H, Hercoles, Inc. Wilmington, Del.), polyacrylamide coatings (described in U.S. Pat. No. 3,556,932 or as the Parez® 631 NC commercial product from American Cyanamid Co., Stamford, Conn.), melamine-formaldehyde coatings and polyethyleneimine coatings.

Cellulosic fibers may also be chemically stiffened by chemical reaction. For instance, suitable crosslinker substances may be added to effect crosslinking taking place within the fiber. Suitable crosslinker substances are typical substances used for crosslinking monomers including but not limited to $C_2$-$C_8$-dialdehydes, $C_2$-$C_8$-monoaldehydes having acid functionality and in particular $C_2$-$C_9$-polycarboxylic acids. Specific substances from this series are for example glutaraldehyde, glyoxal, glyoxylic acid, formaldehyde and citric acid. These substances react with at least 2 hydroxyl groups within any one cellulose chain or between two adjacent cellulose chains within any one cellulose fiber. The crosslinking causes a stiffening of the fibers, to which greater dimensional stability is imparted as a result of this treatment. In addition to their hydrophilic character, these fibers exhibit uniform combinations of stiffening and elasticity. This physical property makes it possible to retain the capillary structure even under simultaneous contact with fluid and compressive forces and to prevent premature collapse.

Chemically crosslinked cellulose fibers are known and described in WO 91/11162, U.S. Pat. Nos. 3,224,926, 3,440,135, 3,932,209, 4,035,147, 4,822,453, 4,888,093, 4,898,642 and U.S. Pat. No. 5,137,537. The chemical crosslinking imparts stiffening to the fiber material, which is ultimately reflected in improved dimensional stability for the hygiene article as a whole. The individual layers are joined together by methods known to one skilled in the art, for example intermelting by heat treatment, addition of hot-melt adhesives, latex binders, etc.

Methods of Making the Absorbent Composition

The absorbent composition is composed of constructions which contain acidic highly swellable hydrogels and the acidic highly swellable hydrogels which are present in said constructions or fixed thereto.

Examples of processes to obtain an absorbent composition comprising for example a base material to which highly swellable hydrogels are fixed on one or both sides are known and included by the invention but not limited thereto.

Examples of processes to obtain an absorbent composition comprising for example highly swellable hydrogels (c) embedded in a fiber material blend of synthetic fibers (a) and cellulose fibers (b), the blend ratio varying from (100 to 0) synthetic fiber: (0 to 100) cellulose fiber, include (1) a process where (a), (b) and (c) are mixed together at one and the same time, (2) a process where a mixture of (a) and (b) is mixed into (c), (3) a process where a mixture of (b) and (c) is mixed with (a), (4) a process where a mixture of (a) and (c) is mixed into (b), (5) a process where (b) and (c) are mixed and (a) is continuously metered in, (6) a process where (a) and (c) are mixed and (b) is continuously metered in, and (7) a process where (b) and (c) are mixed separately into (a). Of these examples, processes (1) and (5) are preferred. The apparatus used in this process is not particularly restricted and any customary apparatus known to one skilled in the art can be used.

The absorbent composition obtained in this way can optionally be subjected to a heat treatment, so that an absorption layer having excellent dimensional stability in the moist state is obtained.

The heat treatment process is not particularly restricted. Examples include heat treatment by feeding hot air or infrared irradiation. The temperature of the heat treatment is in the range from 60° C. to 230° C., preferably from 100° C. to 200° C., particularly preferably from 100° C. to 180° C.

The duration of the heat treatment depends on the type of synthetic fiber, its amount and the hygiene article production rate. Generally the duration of the heat treatment is in the range from 0.5 second to 3 minutes, preferably from 1 second to 1 minute.

The absorbent composition is generally provided for example with a liquid-pervious topsheet and a liquid-impervious backsheet. Furthermore, leg cuffs and adhesive tabs are attached to finalize the hygiene article. The materials and types of pervious topsheet and impervious backsheet and of the leg cuffs and adhesive tabs are known to one skilled in the art and are not particularly restricted. Examples thereof may be found in WO 95/26 209.

Experimental Part

Test Methods a) Centrifuge Retention Capacity (CRC)

This method measures the free swellability of the hydrogel in a teabag. 0.2000±0.0050 g of dried hydrogel (particle size fraction 106-850 µm) are weighed into a teabag 60×85 mm in size which is subsequently sealed. The teabag is placed for 30 minutes in an excess of 0.9% by weight sodium chloride solution (at least 0.83 l of sodium chloride solution/1 g of polymer powder). The teabag is then centrifuged for 3 minutes at 250 g. The amount of liquid is determined by weighing back the centrifuged teabag.

b) Absorbency Under Load (AUL) (0.7 psi)

The measuring cell for determining AUL0.7 psi is a Plexiglass cylinder 60 mm in internal diameter and 50 mm in height. Adhesively attached to its underside is a stainless steel sieve bottom having a mesh size of 36 µm. The measuring cell further includes a plastic plate having a diameter of 59 mm and a weight which can be placed in the measuring cell together with the plastic plate. The plastic plate and the weight together weigh 1 345 g. AUL 0.7 psi is determined by determining the weight of the empty Plexiglass cylinder and of the plastic plate and recording it as $W_0$. 0.900±0.005 g of hydrogel forming polymer (particle size distribution 150-800 µm) is then weighed into the Plexiglass cylinder and distributed very uniformly over the stainless steel sieve bottom. The plastic plate is then carefully placed in the Plexiglass cylinder, the entire unit is weighed and the weight is recorded as $W_a$. The weight is then placed on the plastic plate in the Plexiglass cylinder. A ceramic filter plate 120 mm in diameter and 0 in porosity is then placed in the middle of a Petri dish 200 mm in diameter and 30 mm in height and sufficient 0.9% by weight sodium chloride solution is introduced for the surface of the liquid to be level with the filter plate surface without the surface of the filter plate being wetted. A round filter paper 90 mm in diameter and <20 µm in pore size. (S&S 589 Schwarzband from Schleicher & Schüll) is subsequently placed on the ceramic plate. The Plexiglass cylinder containing hydrogel forming polymer is then placed with plastic plate and weight on top of the filter paper and left there for 60 minutes. At the end of this period, the complete unit is removed from the Petri dish and subsequently the weight is removed from the Plexiglass cylinder. The Plexiglass cylinder containing swollen hydrogel is weighed together with the plastic plate and the weight recorded as $W_b$.

AUL was calculated by the following equation:

$$AUL0.7 \text{ psi}[g/g] = [W_b - W_a]/[W_a - W_0]$$

c) Saline Flow Conductivity (SFC)

The test method for determining SFC is described in U.S. Pat. No. 5,599,335.

d) pH Measurement of Hydrogel Forming Polymers 100 ml of 0.9% by weight NaCl solution is magnetically stirred at moderate speed in a 150 ml beaker without air being drawn into the solution. This solution is admixed with 0.5±0.001 g of hydrogel forming polymer and stirred for 10 minutes. After 10 minutes, the pH of the solution is measured with a pH glass electrode, the value not being read off until it is stable, but at the earliest after 1 minute.

e) Ammonia Determination for Odor Control

The ammonia nitrogen content is determined colorimetrically by the Nessler method. Urea eliminates ammonia under the action of urease; a yellow color develops to a degree proportional to the ammonia concentration.

5 g of the various superabsorbent samples were saturated with 600 ml of 0.9% NaCl and 1.8% urea solution for 20. min. The solutions were filtered and 25 ml of the solution were admixed with 10 μl of urease solution. After 2 minutes nitrogen from ammonia was determined by the Nessler method.

EXAMPLES

Example 1a

A Werner & Pfleiderer laboratory kneader having a working capacity of 2 l is evacuated to 980 mbar absolute by means of a vacuum pump and a previously separately prepared monomer solution which has been cooled to about 25° C. and inertized by passing nitrogen into it is sucked into the kneader. The monomer solution has the following composition: 825.5 g of completely ion-free water, 431 g of acrylic acid, 120.68 g of NaOH 50%, 0.86 g of polyethylene glycol 400 diacrylate (SARTOMER® 344 from Cray Valley). To improve the inertization, the kneader is evacuated and subsequently refilled with nitrogen. This operation is repeated three times. A solution of 1.2 g of sodium persulfate (dissolved in 6.8 g of completely ion-free water) is then sucked in, followed after a further 30 seconds by a further solution consisting of 0.024 g of ascorbic acid dissolved in 4.8 g of completely ion-free water. After a nitrogen purge a preheated jacket heating circuit on bypass at 75° C. is switched over to the kneader jacket and the stirrer speed increased to 96 rpm. Following the onset of polymerization and the attainment of $T_{max}$, the jacket heating circuit is switched back to bypass, and the batch is supplementarily polymerized for 15 minutes without heating/cooling, subsequently cooled and discharged. The resultant gel particles are dried at 160° C. on wire mesh bottomed trays in a through air drying cabinet and then ground and sieved.

Example 1b 1 200 g of the thus obtained product of particle size distribution 105-850 μm were sprayed with a homogeneous solution consisting of 20 g of water, 0.18 g of ethylene glycol diglycidyl ether and 0.6 g of sorbitan monococoate in a powder mixing assembly (Loedige mixer) and transferred into a preheated and 2nd Loedige mixer. The heat treatment was carried out under constant conditions at a jacket temperature of 150° C. and a speed of 60 rpm for a period of 120 minutes. The mixer was emptied, and the product was cooled down to room temperature and sieved off at 105/850 μm to remove any agglomerates or fines which may have formed. The performance data are shown in Table 1.

Example 1c

Example 1b was repeated except that the heat treatment was carried out for 70 minutes only and the postcrosslinking solution for 1 200 g of powder from Example 1a had the following composition: 17.58 g of water, 9.96 g of 1,2-propanediol, 1,2 g of ethylene glycol diglycidyl ether and 3.36 g of aqueous 26.8% aluminum sulfate solution. The performance data are shown in Table 1.

Example 1d

Example 1b was repeated except that the heat treatment was carried out for 15 minutes only and the postcrosslinking solution for 1 200 g of powder from Example 1a had the following composition: 20.00 g of water and 0.90 g of ethylene glycol diglycidyl ether. The performance data are shown in Table 1.

Example 2

A 10 l capacity polyethylene vessel thoroughly insulated with foamed plastic material is charged with 3 928 g of completely ion-free water, 630 g of sodium bicarbonate are suspended in the water, and 2 000 g of acrylic acid are added with stirring in such a way that the reaction solution does not foam over as a result of the onset of $CO_2$ evolution. This is followed by the addition, in succession, of an emulsion of 1.3 g of sorbitan monococoate in 100 g of completely ion-free water and of 6.00 g of allyl methacrylate, and the solution is further inertized by passing nitrogen into it. This is followed by the addition of the initiator system, consisting of 1.66 g of 2,2'-azobisamidinopropane dihydrochloride (dissolved in 20 g of completely ion-free water), 3.33 g of potassium peroxodisulfate (dissolved in 150 g of completely ion-free water) and also 0.3 g of ascorbic acid (dissolved in 25 g of completely ion-free water) in succession with stirring. The reaction solution is then left to stand without stirring. The polymerization which ensues, and in the course of which the temperature rises to about 90° C., produces a solid gel. This solid gel is mechanically comminuted using a meat grinder, dried at 135° C. in a through air cabinet on VA stainless steel wire mesh and then ground and sieved.

Example 2a

Product of Example 2 is postcrosslinked similarly to Example 1b using a postcrosslinking solution which had the following composition for 1 000 g of polymer: 19.26 g of water, 19.50 g of 1,2-propanediol, 0.25 g of 2-oxazolidinone, 0.49 g of aluminum sulfate octadecahydrate. The performance data after a residence time of 30 minutes are shown in Table 1.

Example 2b

Product of Example 2 is postcrosslinked similarly to Example 2a. The performance data after a residence time of 60 minutes are shown in Table 1.

Example 2c

The product of Example 2 is postcrosslinked similarly to Example 2a. The performance data after a residence time of 70 minutes are shown in Table 1.

Example 3

A 10 l capacity polyethylene vessel thoroughly insulated with foamed plastic material is charged with 4 046 g of completely ion-free water, 408 g of lithium hydroxide 1-hydrate are dissolved therein, and 2 000 g of acrylic acid are slowly ,added with stirring. This is followed by the addition, in succession, of an emulsion of 1.3 g of sorbitan monococoate in 100 g of completely ion-free water and of 8.1 g of allyl methacrylate, and the solution is further inertized by passing nitrogen into it. This is followed by the addition of the initiator system, consisting of 1.66 g of 2,2'-azobisamidinopropane dihydrochloride (dissolved in 20 g of completely ion-free water), 3.33 g of potassium peroxodisulfate (dissolved in 150 g of completely ion-free water) and also 0.3 g of ascorbic acid (dissolved in 25 g of completely ion-free water) in succession with stirring. The reaction solution is then allowed to stand without stirring. The polymerization which ensues, and in the course of which the temperature rises to about 90° C., produces a solid gel. This solid gel is mechanically comminuted using a meat grinder. 150 g of the gel thus comminuted are placed in a metal cylinder having an internal diameter of 10 cm and a VA stainless steel wire mesh bottom, dried therein under a 140° C. 3.11 m/sec hot air stream at temperatures of . . . in the course of 25 minutes, subsequently ground and sieved.

Example 3a

Product of Example 3 is admixed on a 20 g scale in a Waring blender (modified attachment for kitchen blender) with a surface postcrosslinking solution (sprayed from a 2 ml hypodermic) consisting of 3.35% of water/1.65% of 1,2-propanediol/0.03% of ethylene glycol diglycidyl ether and 0.075% of aluminum sulfate (each based on polymer) and heat treated at 100° C. in a through air cabinet for 2 hours. The performance data are shown in Table 1.

Example 4

A 10 l capacity polyethylene vessel thoroughly insulated with foamed plastic material is charged with 3 944 g of completely ion-free water, 625 g of sodium bicarbonate are suspended in the water, and 1 400 g of acrylic acid are added with stirring in such a way that the reaction solution does not foam over as a result of the onset of $CO_2$ evolution. This is followed by the addition, in succession, of 600 g of 2-acrylamido-2-methylpropanesulfonic acid and also of an emulsion of 1.3 g of sorbitan monococoate in 100 g of completely ion-free water and of 6.5 g of allyl methacrylate, and the solution is further inertized by passing nitrogen into it. This is followed by the addition of the initiator system, consisting of 1.66 g of 2,2'-azobisamidinopropane dihydrochloride (dissolved in 20 g of completely ion-free water), 3.33 g of potassium peroxodisulfate (dissolved in 150 g of completely ion-free water) and also 0.3 g of ascorbic acid (dissolved in 25 g of completely ion-free water) in succession with stirring. The reaction solution is then left to stand without stirring. The polymerization which ensues, and in the course of which the temperature rises to about 90° C., produces a solid gel. This solid gel is mechanically comminuted using a meat grinder. 150 g of the gel thus comminuted are placed in a metal cylinder having an internal diameter of 10 cm and a VA stainless steel wire mesh bottom, dried therein under a 140° C. 3.1 m/sec hot air stream at temperatures of . . . in the course of 25 minutes, subsequently ground and sieved.

Example 4a

Product of Example 4 is similarly to Example 3a on a 20 g scale in a Waring blender with a surface postcrosslinking solution consisting of 1.95% of water/1.95% of 1,2-propanediol/0.075% of ethylene glycol diglycidyl ether and 0.075% of aluminum sulfate (each based on polymer) and heat treated at 140° C. in a through air drying cabinet for 2 hours. The performance data are shown in Table 1.

Example 5

A superabsorbent characterized by a pH of 5-5.5, prepared similarly to Example 7 of EP 0 316 792 B1, was admixed on a 20 g scale in a Waring blender (modified attachment for kitchen blender) with a surface postcrosslinking solution (sprayed from a 2 ml hypodermic) consisting of 2.3% of water/1.2% of 1,2-propanediol/0.2% of ethylene glycol diglycidyl ether (each based on polymer) and heat treated at 140° C. in a through air drying cabinet for 1 hour. The performance data are shown in Table 1.

Example 6

369.97 of acrylic acid (AA) is admixed with 2.94 g of ETMPTA (ethoxylated trimethylolpropane triacrlyate) (corresponds to 0.06 mol % based on AA). This solution is added with stirring to 184.83 g of a 50% by weight aqueous solution of NaOH (45 mol % based on AA) in 868.17 g of deionized water with cooling. The temperature is measured. At the start, AA is rapidly admixed with ETMPTA until the temperature has reached about 50° C. Thereafter AA has ETMPTA (up to about 75%) added to it dropwise so that the temperature remains at about 50° C.+/−5° C. The remaining AA can be rapidly admixed with ETMPA. The monomer solution is cooled to 10° C. in an ice bath and admixed with 0.09 g of Darocur 1173: Irgacure 651 (2:1 ratio) photoinitiators, which are dissolved with stirring. The monomer solution is cooled again to 10° C. in an ice bath and admixed with 6.832 g of 10% sodium persulfate solution (0.07 mol % based on AA). The monomer solution is added ,in a 1.5 L glass vessel with temperature control. The vessel is placed under a UV emission lamp (20 mWcm$^{-2}$ measured at vessel base). An exothermic polymerization is measured for 7.5 minutes, after which a transparent gel can be removed for further processing.

1 kg of the SAP gel obtained were comminuted for 30 s in a 2 L twin sigma blade mixer to enlarge the surface area and mixed with 100 g of fine SAP powder (particle size <106 um) for a further 90 s. A solution of 26 g of 1% sodium metabisulfite (0.026 mol % based on AA) was added and mixed in for a further 90 s. This was followed by the addition of 20 g of 1% Span 20 solution (sorbitan monolaurate) (0.02% by weight based on gel) and mixed in for 15 s.

The comminuted gel is extruded in an extruder having a 4 mm die plate to enlarge the surface area and subsequently dried on a metal plate having 3 mm holes for air circulation at a gel thickness of 2-4 mm at 160° C. for 45 min.

The dried material is comminuted in a hammer mill and the particle size is adjusted by sieving to 180-710 µm.

The subsequent surface crosslinking is carried out with 4% by weight of a solution containing 1.5% of ethylene glycol diglycidyl ether (EGDGE—Nagase Chemicals Japan as Denacol Ex-810), 36.94% of propylene glycol and 61.56% of water by drying and crosslinking at 145° C. for 60 min.

Example 7

Similar to Example 6 except that 205.37 g of 50% NaOH solution in 847.63 g of water are introduced as initial charge. The performance data are shown in Table 1.

Example 8a

A Werner & Pfleiderer laboratory kneader having a working capacity of 2 l is evacuated to 50 mbar by means of vacuum and a previously separately prepared monomer solution which has been cooled to about 25° C. and inertized by passing nitrogen into it is sucked into the kneader. The monomer solution has the following composition: 3095.7 g of completely ion-free water, 1821.68 g of acrylic acid, 1012-05 g of NaOH 50%, 8.20 g of polyethylene glycol 400 diacrylate (Sartomer® 344 from CRAY VALLEY) and also 1.46 g of sorbitan monococoate. To improve the inertization, the kneader is evacuated and subsequently refilled with nitrogen. This operation is repeated 3 times. Then 35.22 g of an aqueous 15% sodium persulfate solution, 0.18 g of a 1% aqueous hydrogen peroxide solution and, 30 seconds later, 25.50 g of a 0.5% aqueous ascorbic acid solution is sucked in. After a nitrogen purge a preheated jacket heating circuit on bypass at 75° C. is switched over to the kneader jacket and the stirrer speed raised to 96 rpm. Following the onset of polymerization and the attainment of $T_{max}$, the jacket heating circuit is switched back to bypass, and the batch is supplementarily polymerized for 15 minutes without heating/cooling, subsequently cooled and discharged. The resultant gel particles are dried at 160° C. on wire mesh bottomed trays in a through air drying cabinet and then ground and sieved.

Example 8b 1200 g of a thus obtained product of particle size distribution 105-850 µm were sprayed with a homogeneous solution consisting of 39.5 g of water, 19.7 g of 1,2-propanediol and 0.72 g of ethylene glycol diglycidyl ether in a powder mixing assembly (Loedige mixer) and transferred into a second, preheated Loedige mixer. The heat treatment was carried out under constant conditions at a jacket temperature of 150° C. and a speed of 60 rpm for a period of 120 minutes. The mixer was emptied, and the product was cooled down to room temperature and sieved off at 105-850 µm to remove any agglomerates or fines which may have formed. The performance data are shown in Table 1.

Example 9

Superabsorbents as described in Example 1 of WO 00/22018 page 14.

TABLE 1

| Example | pH | SFC × $10^{-7}$ cm$^3$s/g | CRC g/g | AUL 0.7 psi g/g | pH$_{AI}$ |
| --- | --- | --- | --- | --- | --- |
| 1a | 4.44 | 1 | 23.2 | 5.8 | 74.2 |
| 1b | 4.45 | 14.5 | 21.4 | 14.5 | 91.5 |
| 1c | 4.47 | 13.8 | 20.7 | 18.1 | 98.2 |
| 1d | 4.45 | 12 | 21.9 | 14.7 | 93.3 |
| 2 | 4.39 | 1 | 27.6 | 5.0 | 85.1 |
| 2a | 4.39 | 16 | 25.1 | 13.0 | 99.4 |
| 2b | 4.39 | 24 | 23.3 | 15.8 | 102 |
| 2c | 4.39 | 33 | 22.4 | 18.1 | 105.7 |
| 3 | 4.68 | 1 | 32.4 | 4.9 | 86.5 |
| 3a | 4.69 | 9 | 29.0 | 13.9 | 99 |
| 4 | 4.37 | 2 | 30.0 | 4.8 | 91.5 |
| 4a | 4.39 | 31 | 22.4 | 15.7 | 99.4 |
| Example 7 of EP 316 792 not inventive | 5.4 | ≦1 | 42.0 | 6.0 | 76.8 |
| 5 | 5.4 | 17 | 32.9 | 23.0 | 89.4 |
| 6 | 5.1 | 18 | 29.7 | 26.4 | 106.6 |
| 7 | 5.3 | 16 | 30.7 | 26.8 | 97.8 |
| 8 | 5.2 |  | 28.2 | 26.1 | 97.7 |

Table 2 summarizes the experimental results of the ammonia nitrogen determination of the products having different pH values from the examples. Table 2 demonstrates the odor binding effect of acidic superabsorbent products.

TABLE 2

| Example | pH | $N_2$ from $NH_3$ (Nessler) mg/l | Nessler value |
| --- | --- | --- | --- |
| 1c | 4.47 | 1.8 | 20% |
| 6 | 5.1 | 2.1 | 23% |
| 7 | 5.3 | 3.9 | 43% |
| 5 | 5.4 | 5.6 | 62% |
| 9 | 6.1 | 9.0 | 100% |

We claim:
1. A hydrogel-forming polymer capable of absorbing aqueous fluids and having a pH absorbency index pH$_{AI}$ of at least 90 and a pH of not more than 5.7, wherein pH$_{AI}$ is calculated as follows: pH$_{AI}$=ΔpH (AUL$_{0.7\,psi}$+CRC),
    wherein ΔpH=7-pH of product, AUL$_{0.7\,psi}$ is an absorbency under pressure at 0.7 psi, and CRC is a centrifuge retention capacity.
2. The polymer of claim 1 having a pH absorbency index pH$_{AI}$ of at least 100.
3. The polymer of claim 1 having a pH of from 4 to 5.5.
4. The polymer of claim 1 having a pH of from 4.4 to 4.6 or from 5.1 to 5.3.
5. The polymer of claim 1 having a Nessler value of less than 60%.
6. The polymer of claim 1 having a Nessler value of less than 40%.
7. The polymer of claim 1 having a Nessler value of less than 30%.
8. The polymer of claim 1 having a CRC greater than 15 g/g.
9. The polymer of claim 1 having a CRC greater than 26 g/g.
10. The polymer of claim 1 having an AUL$_{0.7\,psi}$ greater than 13 g/g.
11. The polymer of claim 1 having an AUL$_{0.7\,psi}$ greater than 15 g/g.
12. The polymer of claim 1 obtainable from a base polymer having a pH of not more than 5.7.
13. The polymer of claim 1 being an acrylic acid (co)polymer partially neutralized with an alkali metal, an alkaline earth metal, ammonium, or an amine salt.
14. The polymer of claim 1 wherein the polymer is surface postcrosslinked.

15. The polymer of claim 1 having antimicrobial properties.

16. The polymer of claim 1 prepared by polymerizating a partially neutralized acrylic acid with a crosslinking agent to form a gel, wherein
(i) partial neutralization is effected using 50% NaOH or an equivalent neutralizing agent: 20-30 mol% based on acrylic acid, and crosslinking is effected using polyethylene glycol 400 diacrylate: 0.005-1.0%, by weight, based on acrylic acid, or a different crosslinker that produces the same degree of crosslinking, or
(ii) partial neutralization is effected using $NaHCO_3$ or an equivalent neutralizing agent: 23-28%, by weight, based on acrylic acid, and crosslinking is effected using allyl methacrylate: 0.005-1.0%, by weight, based on acrylic acid, or a different crosslinker that produces the same degree of crosslinking, or
(iii) partial neutralization is effected using $LiOH \times H_2O$ or an equivalent neutralizing agent: 15-30%, by weight, based on acrylic acid, and crosslinking is effected using allyl methacrylate: 0.005-1.0%, by weight, based on acrylic acid, or a different crosslinker that produces the same degree of crosslinking, or
(iv) partial neutralization is effected using $NaHCO_3$ or an equivalent neutralizing agent: 35-55%, by weight, based on acrylic acid, when 2-acrylamido-2-methylpropanesulfonic acid is present at 30-55%, by weight, based on acrylic acid, and crosslinking is effected using allyl methacrylate: 0.005-1.0%, by weight, based on acrylic acid, or a different crosslinker that produces the same degree of crosslinking.

17. A base polymer obtained by drying a gel prepared in claim 16.

18. A polymer obtained by surface postcrosslinking the dried base polymer of claim 17.

19. A hygiene article comprising
(A) a liquid pervious topsheet,
(B) a liquid impervious backsheet,
(C) a core positioned between (A) and (B), said core comprising 10% to 100%, by weight, of the hydrogel-forming polymer of claims 1 and 0% to 90%, by weight, of hydrophilic fiber material,
(D) optionally a tissue layer positioned directly above and below said core (C), and
(E) optionally an acquisition layer positioned between (A) and (C).

* * * * *